United States Patent
Maldonado et al.

(10) Patent No.: US 12,019,093 B2
(45) Date of Patent: Jun. 25, 2024

(54) AIR MEASURING DEVICE AND METHODS OF USE

(71) Applicant: Viu Insight Inc., Mason, OH (US)

(72) Inventors: Hugo I. Maldonado, Mason, OH (US); Jeffrey M. Stephens, Cincinnati, OH (US)

(73) Assignee: Viu Insight Inc., Mason, OH (US)

( * ) Notice: Subject to any disclaimer, the term of this patent is extended or adjusted under 35 U.S.C. 154(b) by 767 days.

(21) Appl. No.: 17/106,982

(22) Filed: Nov. 30, 2020

(65) Prior Publication Data

US 2021/0364545 A1    Nov. 25, 2021

Related U.S. Application Data

(60) Provisional application No. 63/027,834, filed on May 20, 2020.

(51) Int. Cl.
*G01P 5/00* (2006.01)
*G01P 1/00* (2006.01)
(Continued)

(52) U.S. Cl.
CPC .............. *G01P 5/001* (2013.01); *G01P 1/06* (2013.01); *G01P 13/025* (2013.01); *B05B 12/008* (2013.01); *G01P 1/122* (2013.01)

(58) Field of Classification Search
CPC .... G01P 1/06; G01P 1/07; G01P 1/122; G01P 13/025; G01P 5/001; E02D 11/00; E02D 7/06; B25D 11/064
See application file for complete search history.

(56) References Cited

U.S. PATENT DOCUMENTS

2010/0312498 A1    12/2010   Hamann et al.
2014/0208869 A1    7/2014    Secor
(Continued)

FOREIGN PATENT DOCUMENTS

EP    2645111 A1 * 10/2013 .............. G01P 5/001
EP    4001926 A1 *  5/2022 .............. F24F 11/56
(Continued)

OTHER PUBLICATIONS

International Search Report and Written Opinion dated Feb. 25, 2021 for International Application No. PCT/US2020/062574, 19 pages.
(Continued)

*Primary Examiner* — Andre J Allen
(74) *Attorney, Agent, or Firm* — Frost Brown Todd LLP

(57) ABSTRACT

A handheld or mountable air measuring device includes a sensor assembly with sensors that measure airspeed simultaneously in two directions that are perpendicular to each other. The device includes a data protocol conversion board allowing the communication between the sensor assembly and a smart device included with or associated with the device. The smart device receives the airspeed data. The smart device includes a user interface that includes a map or layout of the environment within which the device is used. The data is displayed on the smart device on the map. The data can be processed locally or transmitted to a remote location for processing. One or more dashboards are generated from the data and accessible by the smart device or another computing device.

12 Claims, 22 Drawing Sheets

(51) Int. Cl.
*G01P 13/02* (2006.01)
*B05B 12/00* (2018.01)
*G01P 1/12* (2006.01)

(56) References Cited

U.S. PATENT DOCUMENTS

2015/0352585 A1 12/2015 Larson et al.
2017/0205261 A1 7/2017 Yogo et al.

FOREIGN PATENT DOCUMENTS

WO WO 2004/063675 7/2004
WO WO 2020/005431 1/2020

OTHER PUBLICATIONS

Bike Phone Mount—Aluminum Bicycle & Motorcycle Phone Holder, by DEYI, available Feb. 2019 on Amazon.com, downloaded from <https://www.amazon.com/gp/product/B07P6JV84D/ref=ppx_yo_dt_b_asin_title_o06_s00?ie=UTF8&th=1>, 8 pgs.
Motorola, moto g[7] play, cellular phone, specifications, 2020, downloaded from <https://www.boostmobile.com/phones/moto-g7-play.html>, 3 pgs.
AIRSTAT PDA, Portable Acoustic Anemometer, by OMEGA Productive Services, Inc. 1 pg.
"WindSonic Ultrasonic Wind Sensor," GILL Instruments: meteorological technology, Technical Information, 2000, Webpage downloaded from <http://gillinstruments.com/products/anemometer/windsonic.htm>, 7 pgs.
WindSonic, Wind Speed & Direction Sensor, GILL Instruments, Datasheet, 2019, downloaded from <http://gillinstruments.com/data/datasheets/windsonic-1405-027-iss7.pdf>, 2 pgs.
WindSonic, SDI-12, Wind Speed & Direction Sensor, GILL Instruments, Datasheet, 2019, downloaded from < http://gillinstruments.com/data/datasheets/Windsonic-SDI-12%20Iss6.pdf>, 2 pgs.

* cited by examiner

AIR MEASURING DEVICE AND METHODS OF USE

BACKGROUND

Critical process environments rely on precisely controlled conditions for air quality and air quantity in order to achieve either high quality manufacturing throughput and/or provide an environment that reduces risk of contamination. A critical process environment is a space where air must comply with stringent specifications. For instance, these specifications may include parameters for quality like temperature, humidity, and level of cleanliness. Also, these specifications may include parameters for quantity like volume, speed and direction. While a variety of air measurement devices and methods have been made and used, it is believed that no one prior to the inventor(s) has made or used an invention as described herein.

BRIEF DESCRIPTION OF THE DRAWINGS

While the specification concludes with claims which particularly point out and distinctly claim the invention, it is believed the present invention will be better understood from the following description of certain examples taken in conjunction with the accompanying drawings, in which like reference numerals identify the same elements.

Figure 1:
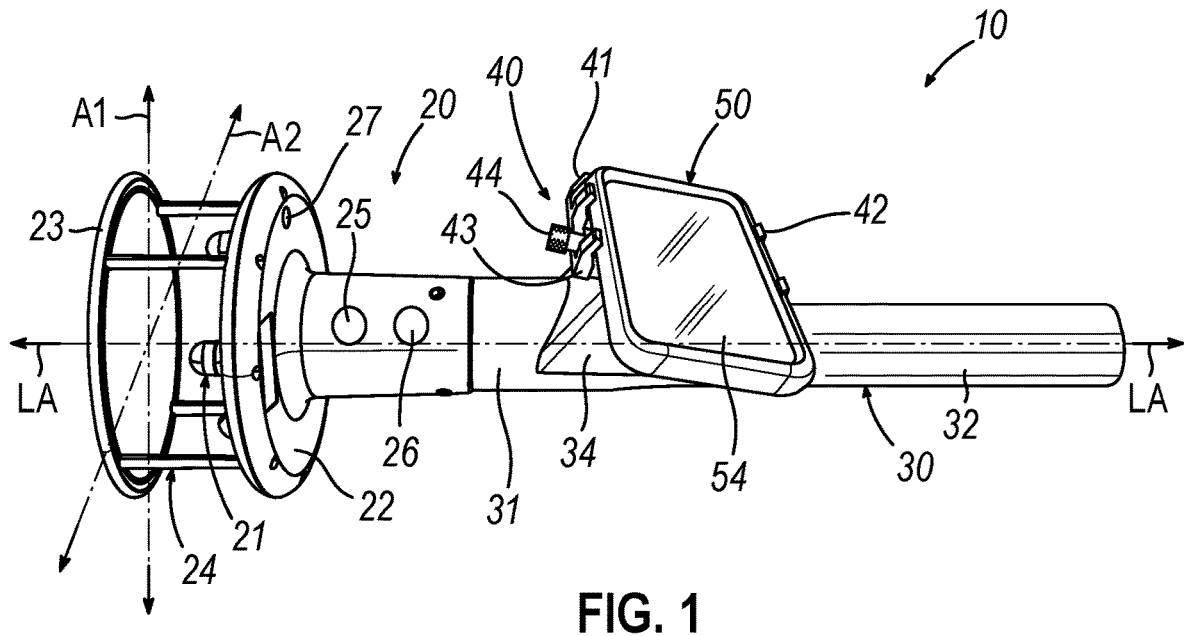
FIG. 1 depicts a perspective view of an exemplary air measuring device.
Figure 2:
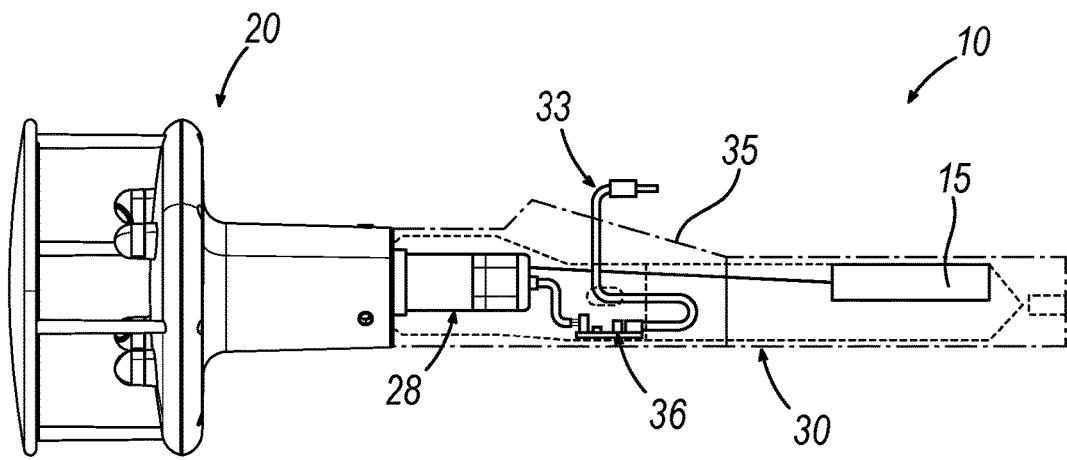
FIG. 2 depicts a side cross section view of the device of FIG. 1, with an attachment feature removed.

The drawings are not intended to be limiting in any way, and it is contemplated that various embodiments of the invention may be carried out in a variety of other ways, including those not necessarily depicted in the drawings. The accompanying drawings incorporated in and forming a part of the specification illustrate several aspects of the present invention, and together with the description serve to explain the principles of the invention; it being understood, however, that this invention is not limited to the precise arrangements shown.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

I. Exemplary Environments and Air Measuring Device

Critical process environments play an important role in manufacturing processes, laboratory designs, healthcare functions, etc. More specific examples where critical process environments are used include, but are not limited to automotive paint application systems, electronic chip manufacturing, healthcare surgical and isolation rooms, pharmaceutical manufacturing, medical device manufacturing, aerospace/defense applications, among others. Still other environments where air quality metrics are important include, among others, classrooms or meeting rooms for education or business, transportation cabins, and indoor dining facilities. The following paragraphs discuss an exemplary air measuring device and methods of use for application in such critical process environments.

FIG. 1 illustrates an exemplary air measuring device (10) for use in industry applications and environments that involve critical process environments as described above. Device (10) comprises a sensor assembly (20), a body (30) connectable with sensor assembly (20), an attachment feature (40) connectable with the body (30), and a smart device (50) connectable with attachment feature (40) to thereby connect with body (30).

Sensor assembly (20) is configured as an anemometer that can detect air speed in two directions contemporaneously or substantially contemporaneously. In the present example, sensor assembly (20) is configured to detect air speed along two axes (A1, A2) that are perpendicular or substantially perpendicular to each other. In the present example, sensor assembly (20) comprises an ultrasonic anemometer capable of detecting air speeds down to as little as two feet per minute. By way of example only, exemplary anemometers usable for sensor assembly (20) of device (10) are available from Gill Instruments Limited of the United Kingdom.

Sensor assembly (20) is connectable with body (30), and in the present example sensor assembly (20) is connected with body (30) using fasteners such as screws or other suitable fasteners as will be apparent to those of ordinary skill in the art in view of the teachings herein. By way of example only, and not limitation, other fastener types can include bolts, rivets, snap-fit features, or other interlocking features.

Sensor assembly (20) includes sensors (21) configured to detect and measure air speed along axes (A1, A2). This information is collected and recorded as data (57) as described further below. Sensors (21) are located between a base (22) and a top (23) of sensor assembly (20), which are separated by posts (24). Although not required in all versions, sensor assembly (20) also includes sensors (25, 26) configured to detect temperature and humidity of the surrounding air. Sensor assembly (20) further includes an alignment feature (27) configured to indicate the orientation sensor assembly (20) should have when connected with body (30). This ensures that sensors (21) are positioned as desired during use of device (10) such that axes (A1, A2), along which air speed measurements are taken, are oriented in the same manner from device (10) to device (10) and use to use.

Sensor assembly (20) further includes a connector (28) that is configured to connect with a power source (15) to provide power to sensor assembly (20). Connector (28) is further configured to connect with smart device (50) such that data collected by sensors (21, 25, 26) is transmittable to smart device (50) for display and/or processing. In some versions, smart device (50) is configured to provide power to sensor assembly (20) through its connection with connector (28) such that separate power source (15) can be omitted. Still in other versions, power source (15) of device (10) includes one or more batteries, which may be rechargeable in some versions, and connector (28) is connectable via wiring within device (10) to the battery power source for powering sensor assembly (20) independent from smart device (50). In some versions, connector (28) is configured for data transmission while powering sensor assembly (20) occurs via other connectors or wiring within device (10). In view of the teachings herein, other ways to power sensor assembly (20) and transmit data from sensor assembly (20) will be apparent to those of ordinary skill in the art.

Body (30) comprises an attachment portion (31) at a distal end, and a handle portion (32) at a proximal end. Attachment portion (31) is configured to receive and connect with sensor assembly (20) via fasteners as mentioned above. Handle portion (32) is configured to allow handheld use of device (10). In this manner, device (10) is configured as a mobile handheld measuring apparatus that can be readily moved throughout a site or environment to capture desired air speed data. In the illustrated version, handle portion (32) is configured with an ellipsoid profile, although in other versions the profile of handle portion (32) differs. In the present example, body (30) comprises a molded construction. However, other forms of construction for body (30) can be used and will be apparent to those of ordinary skill in the art based on the teachings herein.

Body (30) comprises one or more internal spaces or hollow regions. In some examples, body (30) is configured as a tubular structure that is closed at its proximal end and connects with sensor assembly (20) at its distal end. Within body (30), is an adapter (33) configured to connect with connector (28) of sensory assembly (20) at one end. The other end of adapter (33) is configured to connect with smart device (50). In the present example, a base part of sensory assembly (20), including connector (28), extends within an opening in the distal end of body (30) such that connector (28) is within body (30). Adapter (33) is connectable with connector (28), and adapter (33) may be extendable distally from body (30) to establish connection with connector (28) prior to sensor assembly (20) being connected with body (30).

At the other end of adapter (33), adapter (33) makes a connection with smart device (50). In the present example, adapter (33) includes a USB-C male feature at the end of adapter (33) opposite to the end connecting with connector (28) of sensor assembly (20). Smart device (50), in the present example, includes a USB-C female feature, which is connectable with the USB-C male feature of adapter (33). As mentioned above, this connection via USB-C is able to provide for both data and power communication between sensor assembly (20) and smart device (50). Still yet, adapter (33) can be configured in other ways to connect with both sensor assembly (20) and smart device (50). In view of the teachings herein, other such ways will be apparent to those of ordinary skill in the art.

In the present example, adapter (33) includes or is separated by a data protocol conversion board (36). Board (36) in this example is configured to pull data from sensor assembly (20) and convert the data protocol received by sensor assembly (20) to another data protocol that is usable with smart device (50). Board (36) is further configured to transmit power from power source (55) to sensor assembly (20). Again, as mentioned, power source (55) may be a battery within smart device (50) or may be a battery within device (10) but separate from smart device (50). In some other examples, board (36) may be omitted where the data protocol from sensory assembly (20) is usable with smart device (50) without needed conversion. Board (36) may also be omitted in the instance where smart device (50) is equipped with such data protocol conversion functionality. In view of the teachings herein, those of ordinary skill in the art will appreciate other ways to collect and transfer the data from sensor assembly (20) to smart device (50) such that the data is readable and usable with smart device (50).

Body (30) further includes a dock portion (34) between its proximal and distal ends that is configured to receive attachment feature (40). Dock portion (34) is a molded region of body (33) in the present example. Dock portion (34) includes an angled surface (35). Angled surface (35) is configured such that once attachment feature (40) is connected with dock portion (35), smart device (50) retained within attachment feature (40) presents its display to a user of device (10). For instance, device (10) defines a longitudinal axis (LA). In use device (10) is held such that longitudinal axis (LA) is parallel or substantially parallel with the ground or floor of the use environment. With the user standing upright, longitudinal axis (LA) of the device would be perpendicular to a longitudinal axis of the user. Angled surface (35) provides for positioning smart device (50) such that its display is angled toward the user for ease of viewing.

Attachment feature (40) in the present version connects with body (30) by way of a fastener, such as a screw or other suitable fastener as will be apparent to those of ordinary skill in the art in view of the teachings herein. As mentioned above, attachment feature (40) is connectable with dock portion (34) of body (30). Attachment feature (40) comprises a plate (41), and plate (41) is configured to contact angled surface (35) of body (30). A fastener extends through plate (41) and into body (30) to thereby connect attachment feature (40) with body (30).

Plate (41) includes a stationary jaw (42) at one end. Opposite to stationary jaw (42), attachment feature (40)

includes a movable jaw (43). An actuator (44) is configured to move jaw (43) relative to jaw (42), which effectively opens and/or closes a clamp of attachment feature (40). As shown, smart device (50) can be fit within the open jaws (42, 43) and then actuator (44) used to close the clamp by moving jaw (43) toward jaw (42) and thus gripping smart device (50). In the present example, actuator (44) is configured as a threaded bolt that is rotatable. Plate (41) also includes a threaded bore configured to receive the threaded bolt. Attachment feature (40) further can include posts or guide features along outer portions of movable jaw (43). These posts or guide features are connectable with plate (41) to maintain alignment of jaw (43) during movement. In view of the teachings herein, various other attachment features usable with device (10), or modifications to attachment feature (40), will be apparent to those of ordinary skill in the art.

Figure 3:
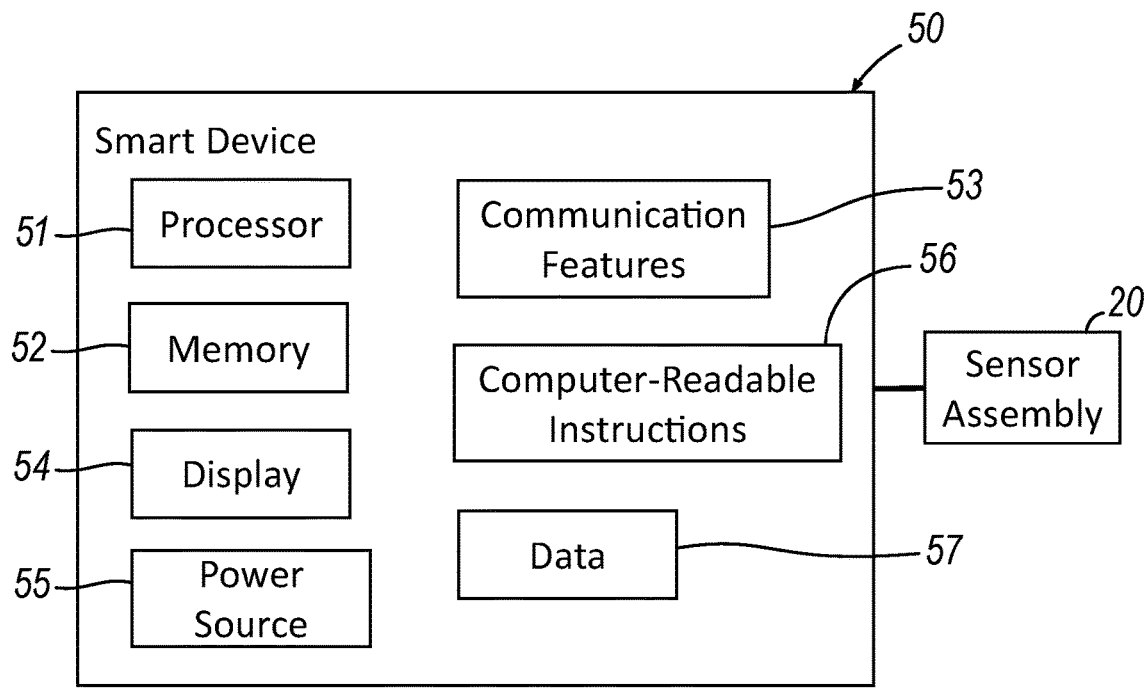
FIG. 3 depicts a schematic view of exemplary components of a computing device of the air measuring device of FIG. 1.

Referring now to FIGS. 1 and 3, smart device (50) is configured as a computing device comprising a processor (51), a memory or storage (52) containing an operating system and other computer-readable instructions (56), one or more communications features (53), a display (54), and a power source such as a battery (55). Memory or storage (52) can be considered a non-transitory computer-readable medium containing one or more sets of instructions (56) for execution. For instance, processor (51) is operable to read and execute computer-readable instructions, which may be stored locally on smart device (50), or remote from smart device (50) yet accessible via one or more communications features (53). Memory (52) is configured to store data and other computer-readable information such as instructions. Exemplary computer-readable instructions that are executable by processor (51), are described further below with respect to the description of the use of device (10), and can include one or more commands pertaining to how device (10) is operated and how resultant data from sensor assembly (20) is captured, processed, and displayed. In at least some instances, memory (52) is configured to store one or more applications, which represent, among other things, related computer-readable instructions for execution by processor (51).

One or more of communications features (53) of smart device (50) are configured to transmit and receive data or other computer-readable and executable information. Communications features (53) can include wired networking features or wireless networking features. The wireless networking features can include a Wi-Fi adapter, near field communication (NFC) features, and Bluetooth features. Display (54) is configured to present information to a user visually. Display (54) is also configured as an input device in the present example, which is achieved by display (54) being configured as a touchscreen. The components mentioned above for smart device (50) are not exhaustive and in view of the teachings herein, other features incorporable into smart device (50) will be apparent to those of ordinary skill in the art.

Figure 4:
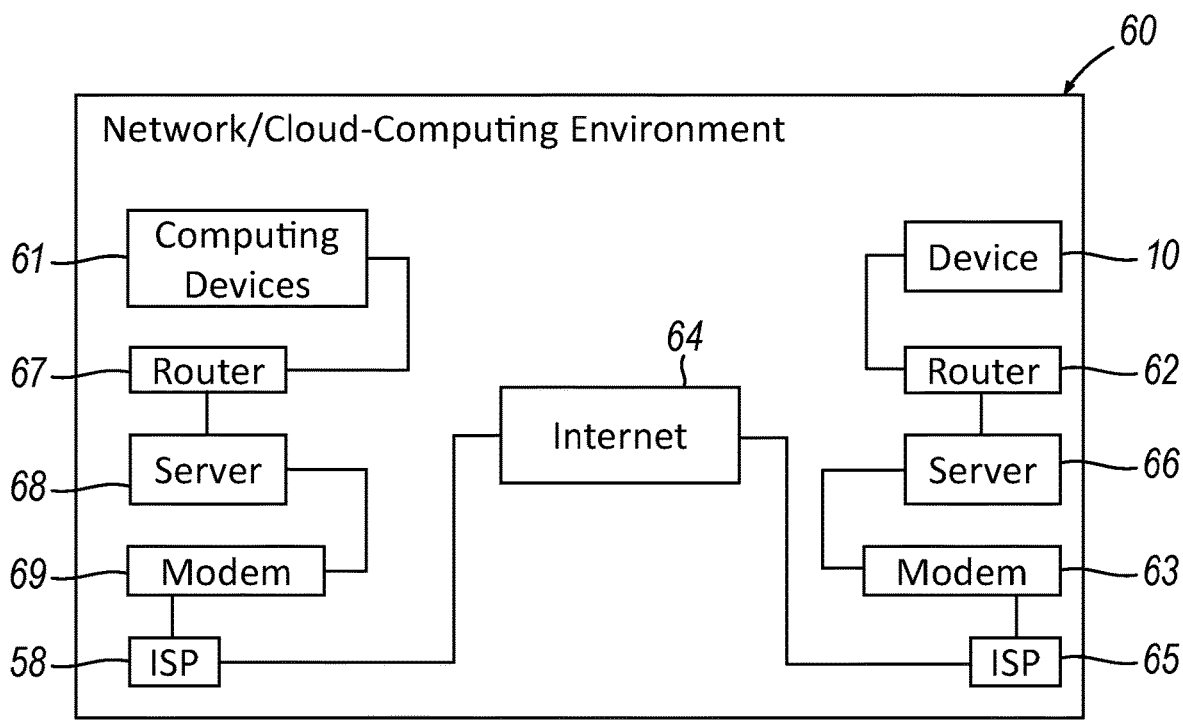
FIG. 4 depicts a schematic view of an exemplary network computing environment usable with the air measuring device of FIG. 1.

FIG. 4 illustrates an exemplary network or cloud computing environment (60) that is usable with device (10). More specifically, smart device (50) can communicate with other computing devices (61) located remote from smart device (50) by way of one or more communication features (53) of smart device (50). In the present example, smart device (50) and its communication features (53) are configured to access remote networks via the internet (64). For instance, communication features (53) of smart device (50) can comprise a wireless network adapter that establishes connectivity with a wireless router (62) connectable with a server (66), which is connectable with a modem (63) to access internet (64) via an internet service provider (ISP) (65). Similarly, computing devices (61) can be connected with a router (67) or switch that is connectable with a server (68), which is connectable with a modem (69) to access internet (64) via an ISP (58). In other examples cellular communication adapters and networks may be used instead of wi-fi network systems. Also, in other instances, smart device (50) and its communication features (53) are configured to access other computing devices (61) that may be remote from smart device (50) but connected with the same local network.

With these network connections, data captured by device (10) can be transmitted to other computing devices (61) for additional processing, storage, and reporting. In one such example, data collected by device (10) is stored in memory (52) of smart device (50) either temporarily or until deleted by a user. This data is transmitted to a cloud storage location such as server (68), located on a remote network. This data is accessed by computing devices (61) and various algorithms are run on the data to analyze and process the data as well as illustrate or depict the data or transformations of the data. This analysis and its output are then transmitted and/or made accessible to smart device (50) or another computing device (61) that may be on the same or different network as smart device (50).

In some versions, it is not needed or required to transmit the data from smart device (50) to another computing device (61). For instance, smart device (50) can, in some versions, include computer executable instructions to analyze and present the data all within the structure of smart device (50). However, with the cloud-based computing environment described above, it may be possible to leverage greater data sets and historical data as well as to conduct quicker and more detailed analysis of the data. In these cloud-based computing contexts, in some but not all instances, smart device (50) is configured to collect, transmit, and display data while other remote computing devices (61) are configured to analyze the data and relay the output back to smart device (50) or another computing device (61) for display or presentation. In view of the teachings herein, various other computing architectures and ways to collect, transmit, analyze or otherwise process, and present collected data from sensory assembly (20) of device (10) will be apparent to those of ordinary skill in the art.

Figure 23:
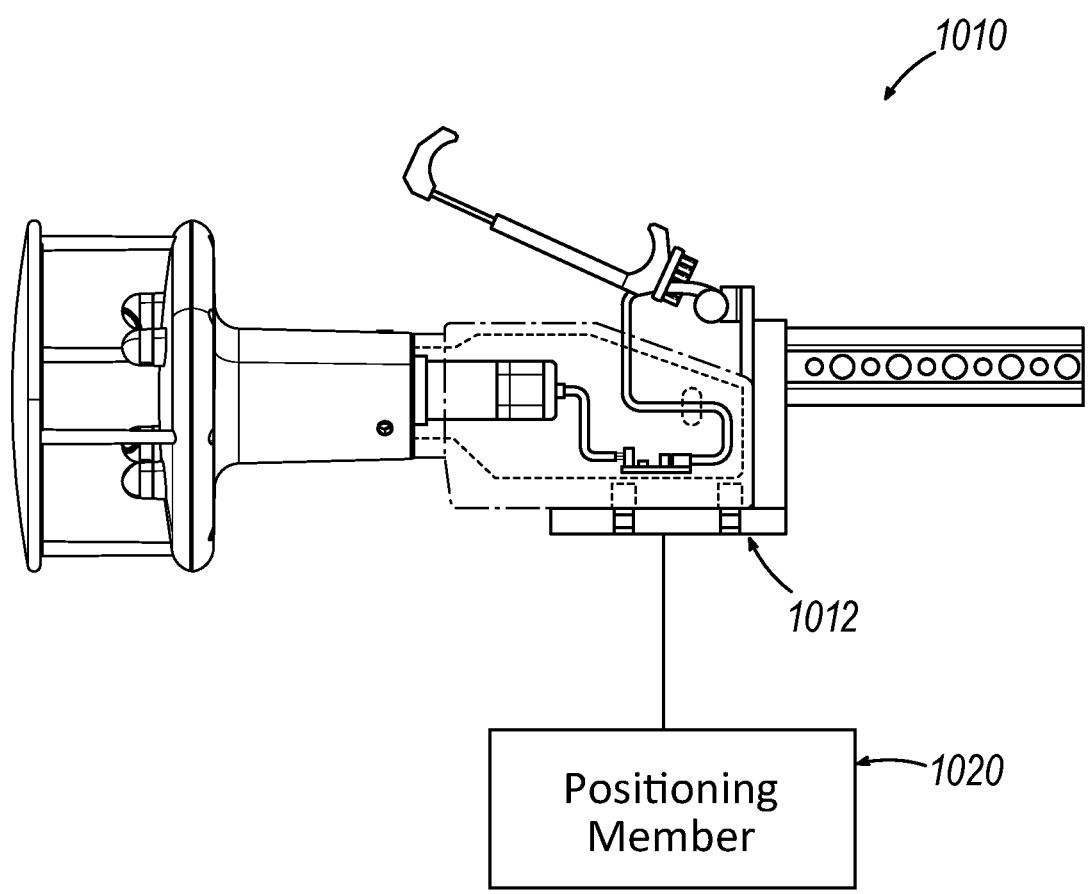
FIG. 23 depicts a side cross section view of another exemplary airspeed measuring device, shown with a mounting feature connectable with a positioning member.

FIG. 23 depicts another exemplary airspeed measuring device (1010) similar to device (10). Device (1010) includes all the components and features of device (10) and is operable in the same manner as described above. Device (1010), however, includes a mounting feature (1012) that is configured to selectively receive a positioning member (1020). In the present example, mounting feature (1012) includes threaded bores that are configured to receive threaded posts or other threaded fasteners of positioning member (1020). Other ways to selectively connect device (1010) with positioning member (1020) will be apparent to those of ordinary skill in the art in view of the teachings herein.

In one version position member (1020) comprises a tripod, however in other versions positioning member (1020) may comprise a monopod or another mountable structure. By way of further example, in another version positioning member (1020) comprises a moveable cart or trolly. Such a cart or trolly may be manually moved within a use environment or may be remotely controlled to reposition device (1010) within the use environment. In view of the teachings herein, other positioning members (1020) will be apparent to those of ordinary skill in the art.

It should be understood that, based on the similarity between devices (10) and (1010), device (1010) may be used in place of device (10) and vice versa. Therefore, any example herein using device (10) should be understood to work in the same manner with device (1010). Similarly, any example herein using device (1010) should be understood to work in the same manner with device (10).

II. Exemplary Spray Booth Application(s)

One application, among others, where device (10) can be used is with manufacturing operations involving spray applications. Such spray applications can include things like paint spraying, coating spraying, chemical spraying, etc. Below is an exemplary application for a paint spray booth in the automotive fabrication or repair context. This exemplary application is not intended to be limiting, and device (10) has applications beyond this automotive paint spray context.

A. Exemplary User Interface and Operating Modes

Figure 5:
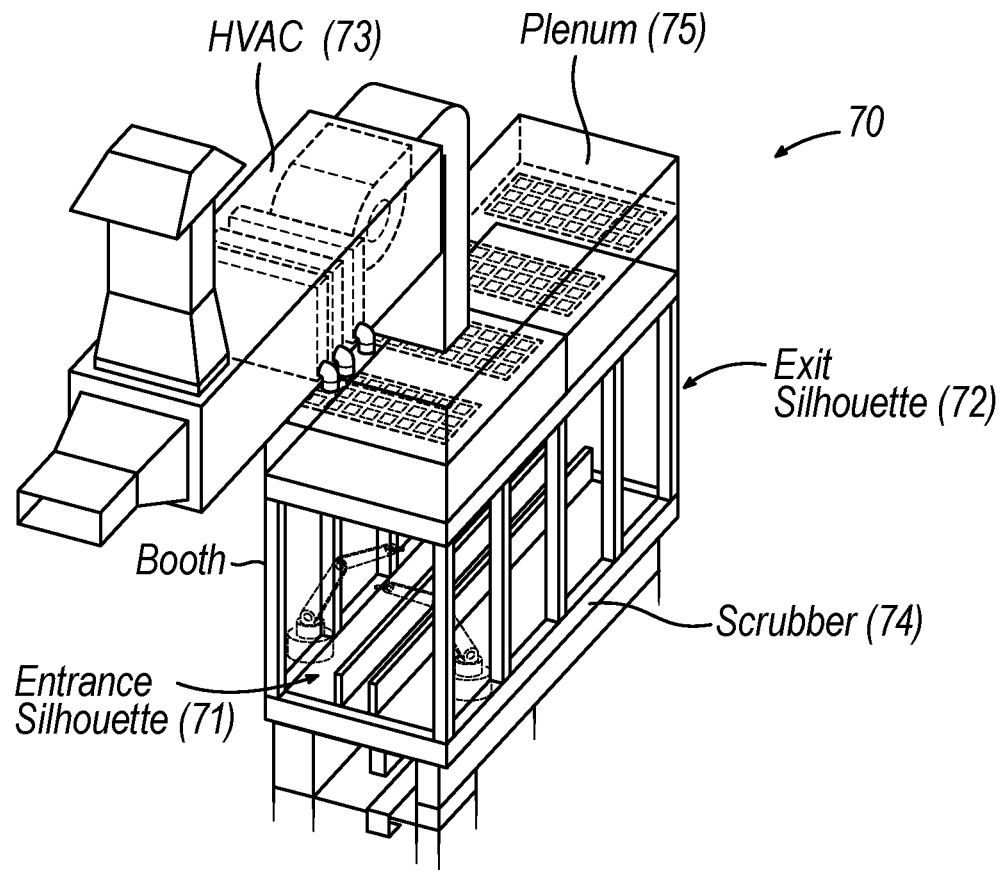
FIG. 5 depicts a perspective view of an exemplary paint spray booth environment, which may be suited for use with the air measuring device of FIG. 1

FIG. 5 illustrates an exemplary spray booth (70) for use in the automotive industry when painting and coating vehicles. Spray booth (70) comprises an entrance (71) at one end, an exit (72) at an opposite end to entrance (71), a HVAC system (73), and a scrubber (74). HVAC system (73) includes a plenum (75). In operation, fresh air or conditioned air is directed from the plenum (75) toward the scrubber (74). As shown in the illustrated example, the plenum (75) is located along a top or ceiling area of spray booth (70), while scrubber (74) is located in or beneath a floor of spray booth (70). Within spray booth (70), the floor includes grates or other structures that allow the air to pass through to scrubber (74). With this configuration, air is directed downward within spray booth (70). This downward airflow is referred to herein as the downdraft, which is sometimes abbreviated as "DD." In a spray application, such as one for use with spray booth (70), it is desirable to have a prescribed and controlled downdraft. Doing so promotes better control of the spray application that is being applied to the vehicle or other object. In some examples, the target for the downdraft throughout spray booth (70) is about 60 feet per minute (FPM). In other instances, this target may differ, and for example be in the range of 40-70 FPM.

Another airflow parameter to consider in spray booth (70) is air that flows in a cross direction relative to the downdraft air. This cross-direction airflow is referred to herein as the crossdraft, which is sometimes abbreviated as "CD." In a spray application, such as one for use with spray booth (70), it is desirable to minimize the crossdraft. Doing so promotes better control of the spray application that is being applied to the vehicle or other object. In some examples, the target for the crossdraft throughout spray booth (70) is 0 FPM.

Figure 6:
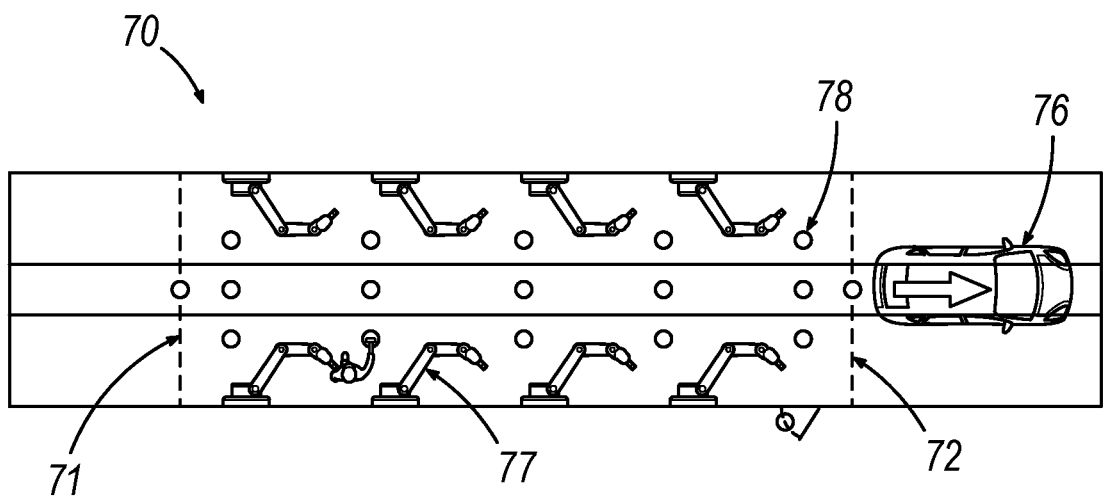
FIG. 6 depicts a schematic view of exemplary measuring positions within the paint spray booth environment of FIG. 5.

In an exemplary spray application in spray booth (70), a vehicle enters at entrance (71) and proceeds along toward exit (72). In some examples, booth (70) can be long and have multiple spray application stages along booth (70). Still yet in other versions, spray booth (70) can be configured as a single stage spray application. Referring to FIG. 6, an exemplary vehicle (76) is shown moving through spray booth (70). In this illustration, the dashed lines represent the respective entrance (71) and exit (72). As shown, a plurality of spray applicators (77) are located within booth (70) between entrance (71) and exit (72). Spray applicators (77) are configured to apply the spray medium, which may be a paint, coating, chemical, etc.

In using device (10) in the environment of spray booth (70), a plurality of measurement locations (78) are determined. As shown in the example of FIG. 6, 18 locations are identified for measurement locations (78). It should be noted that in other versions, the precise number and location of measurement locations (78) can differ from the example illustrated in FIG. 6. However, returning to FIG. 6, measurement locations (78) are identified along five rows with three measurements per row with one at a center region across the length of spray booth (70), one along a right region, and one along a left region across the length of spray booth (70). In the present example, the center region aligns with the center of a conveyor upon which vehicle (76) travels through booth (70). The right and left regions in the present example are located about two feet from the conveyor. Again, in other versions the precise locations may be setup in other configurations as will be apparent to those of ordinary skill in the art in view of the teachings herein. In addition, along the center region a measurement location (78) is identified at entrance (71) and exit (72). Lastly, spray booth (70) includes a door (79) allowing access to spray booth (70), and another measurement location (78) is identified at door (79). In some other versions, door (79) may be omitted.

When using device (10), a user would position themselves to position sensor assembly (20) of device (10) at each of measurement locations (78). When positioned in this manner, device (10) is activated to obtain data in terms of airflow direction and speed. Specifically, device (10) is aligned such that the data obtained provides an air speed for downdraft and crossdraft at each measurement location (78). Therefore, after collecting data at each location (78) identified in FIG. 6, the user has obtained data at 18 locations throughout booth (70). Device (10) is further configured such that it may collect and report any number of data samples at each location. For instance, in some examples a single measurement may be taken at each location (78). Still in other versions, three measurements may be taken at each location (78) and the average of the three measurements reported for the given location (78).

Referring to FIGS. 7-14, a user interface (80) of smart device (50) is shown. With user interface (80), various options are selectable by the user. Some of these options represent various modes for use of device (10). For instance, one such mode is a continuous mode (81). In continuous mode (81), device (10) will read airspeed in a continuous manner at a rate of 1 reading per second. Based on the desired sampling number—which can be set in the settings (82) option—the sampling will average the selected number of measurements and save that calculated value. By way of example only, if sampling is set to five, the device will get five consecutive measurements, one per second, and calculate and save the average at the end of the five second period. The average reading will be displayed as downdraft and crossdraft as identified by directional arrows (83). When finished, this data is saved in a local file that can be accessed under the files (84) option. After saving the value, the application will automatically restart the reading of the next five values. This continuous measurement cycle will continue until the user taps Stop on the screen.

Another mode of operation is random mode (85). Under this reading mode, the user will collect readings without any predefined pattern or frequency. When "Read" is selected, the application will take as many samples as defined in the sampling settings and calculate the average for both downdraft and crossdraft. Those values will be displayed on the screen with directional arrows (83). From here the user may select "Save" to save the already captured measurements, or select "Next" to take a new reading. As the user continues to make new readings by selecting "Next," new rows of data points will be added to the table. When finished, this data can be saved in a local file that can be accessed under the files (84) option.

Another mode of operation is booth mode (86). In this mode a predefined layout of data points is used. This predefined layout of data points corresponds with measurement locations (78) as described above. In the present example, the layout of measurement locations (78) includes (a) entrance (71), (b) a matrix of 3×3 points defined as 3 rows of 3 readings each with one at the left of the conveyor, one in the center of the conveyor and one at the right of the conveyor, (c) exit (72), and (d) door (79). For the readings at entrance (71), exit (72), and door (79), only the value for crossdraft will be displayed as downdraft is not of interest at these locations. In other examples, other matrices of data points can be used, such as 5×3 defined as 5 rows of 3 readings each with one at the left of the conveyor, one in the center of the conveyor and one at the right of the conveyor. In other versions the matrix is a 6×3 defined by defined as 6 rows of 3 readings each with one at the left of the conveyor, one in the center of the conveyor and one at the right of the conveyor. In view of the teachings herein, various other layouts of data points for locations (78) to be used in booth mode (86) will be apparent to those of ordinary skill in the art.

In the present example, but not required in all instances necessarily, to capture data, after selecting booth mode (86), the application presents a configuration screen to select the information including: (a) customer, (b) site, (c) shop, (d) line, (e) process, and (f) zone. The options available for these fields are predefined in the configuration file that is or can be imported in settings (82). The user selects an option for each field, after which the user selects "Next" on the screen. Following this, the user interface displays a booth layout or map (87). The user can then select the location (78) where to perform the next measurement and then tap "Read" on the screen. Once the reading is completed, values for downdraft and cross draft are associated with the selected location (78) and saved. As mentioned above, for entrance (71), exit (72), and door (79), only crossdraft data is associated and saved.

Another mode for taking readings and collecting data is detailed booth mode (88). In this mode, you can perform a reading similar to the booth reading, with a difference being that instead of a prefixed number of rows of data—such as the 3×3 matrix of booth mode (86) shown in FIG. 10—the user can define how many rows of data to complete. In this manner, the user can perform a detailed mapping of the airspeed in the booth with measurement locations or positions (78) as close to each other as desired. In one example of a detailed booth mode (88), a set of readings is taken across booth (70) in the center of each ceiling filter, or about every meter of booth length. In such an example, device (10) is held at about chest height, and a line of floor grating is used as a guide to be able to return to the same position for the left and right readings.

Figure 12:
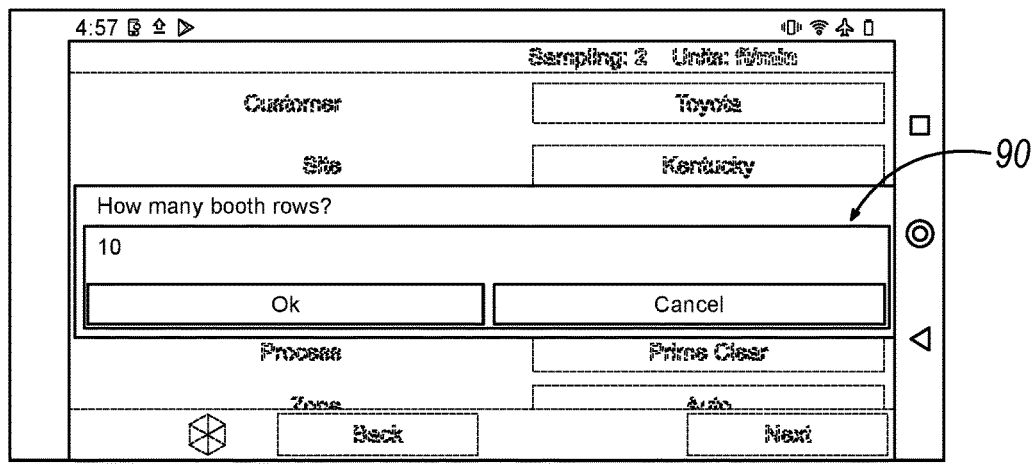
Figure 13:
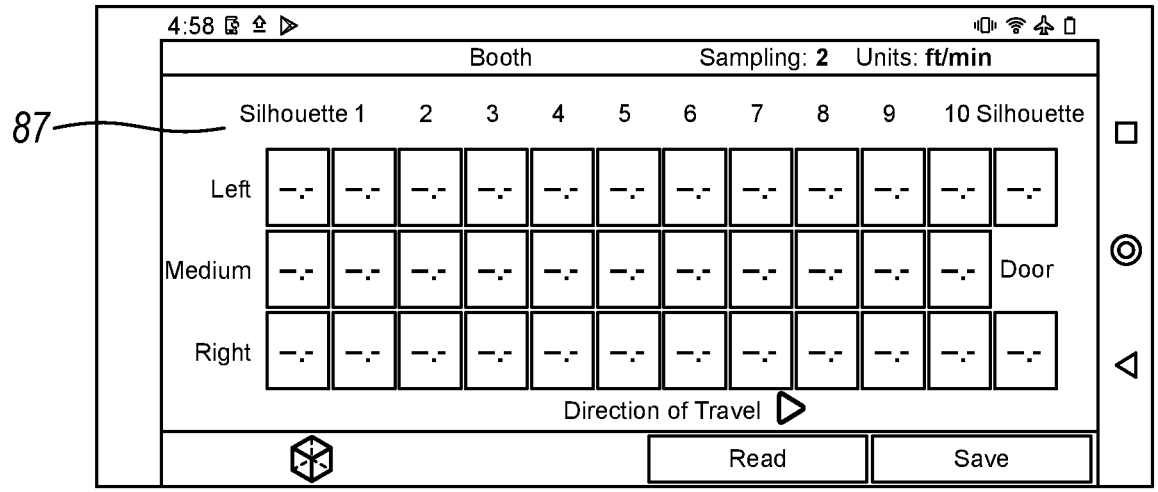

In an example of detailed booth mode (88), once selected a configuration interface (89) appears as described above with respect to booth mode (86). After selecting the field options and advancing by selecting "Next," an input field appears for the user to enter the number of rows to use in the matrix. In the present example, each row comprises a reading set of 3 values: left, center, right. FIG. 12 illustrates an exemplary input field (90) for the desired number or rows, which in this example is input as 10. After entering the row input, as shown in FIG. 13, booth layout or map (87) of the data points is presented based on the input. In this example of FIG. 13, booth layout or map (87) illustrates 10 rows of data taken at 3 locations or positions, and also data collected at entrance (71), exit (72), and door (79).

Figure 7:
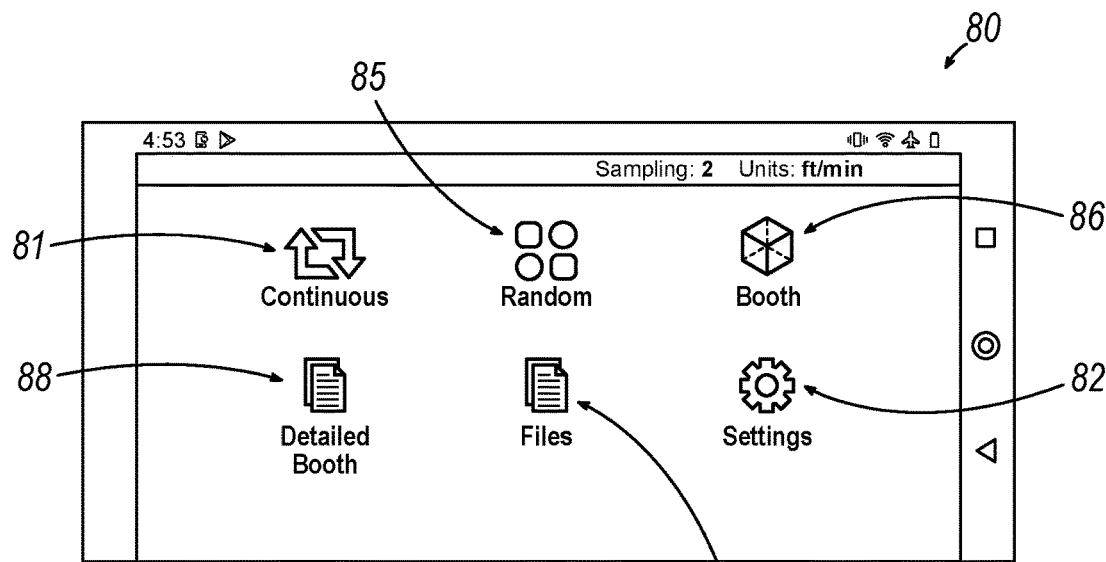
FIGS. 7-14 depict exemplary user interfaces of the computing device of the air measuring device of FIG. 1 usable in a paint spray booth use environment, the user interfaces configured to receive inputs from a user and display data to the user.
Figure 8:
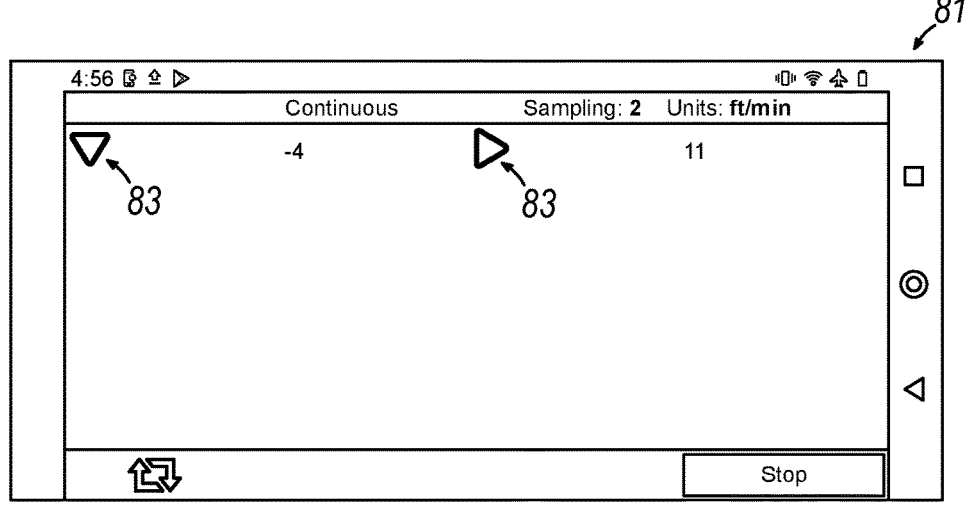
Figure 9:
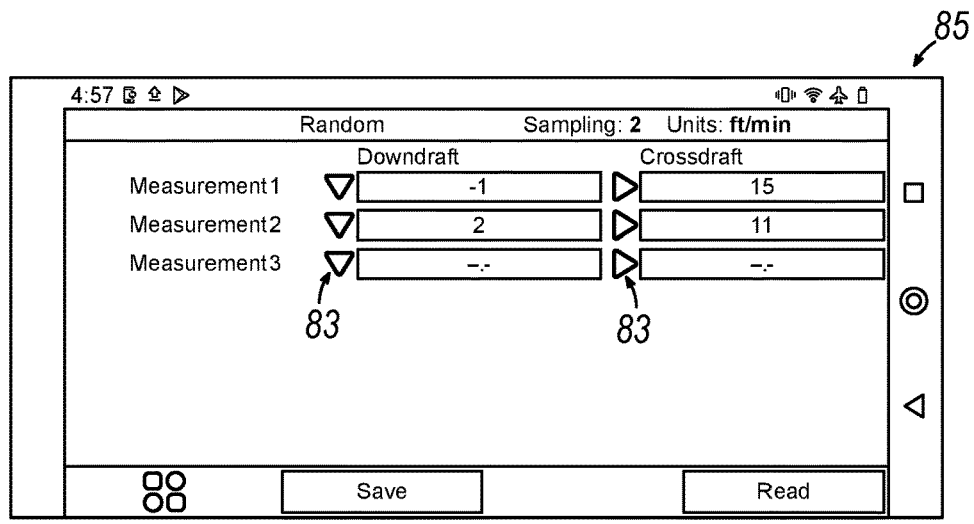
Figure 10:
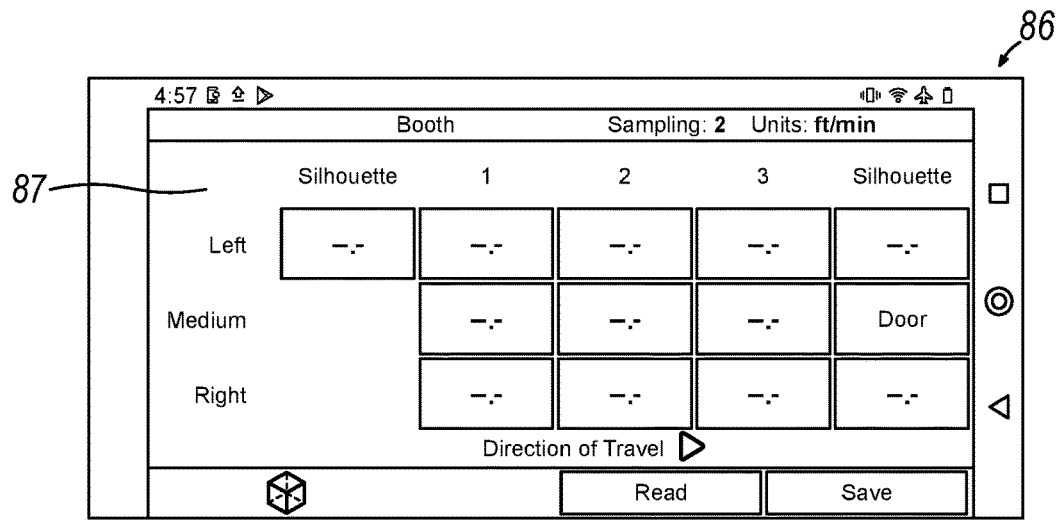
Figure 11:
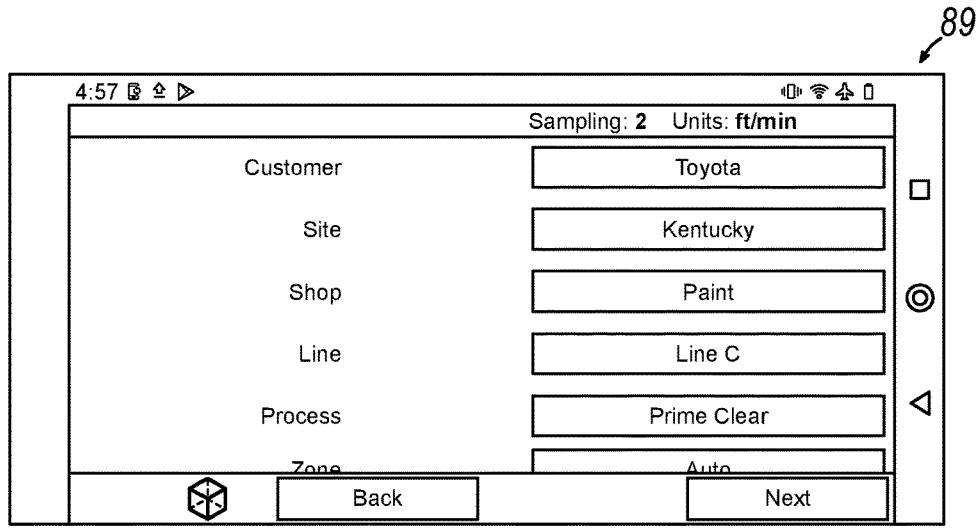
Figure 14:
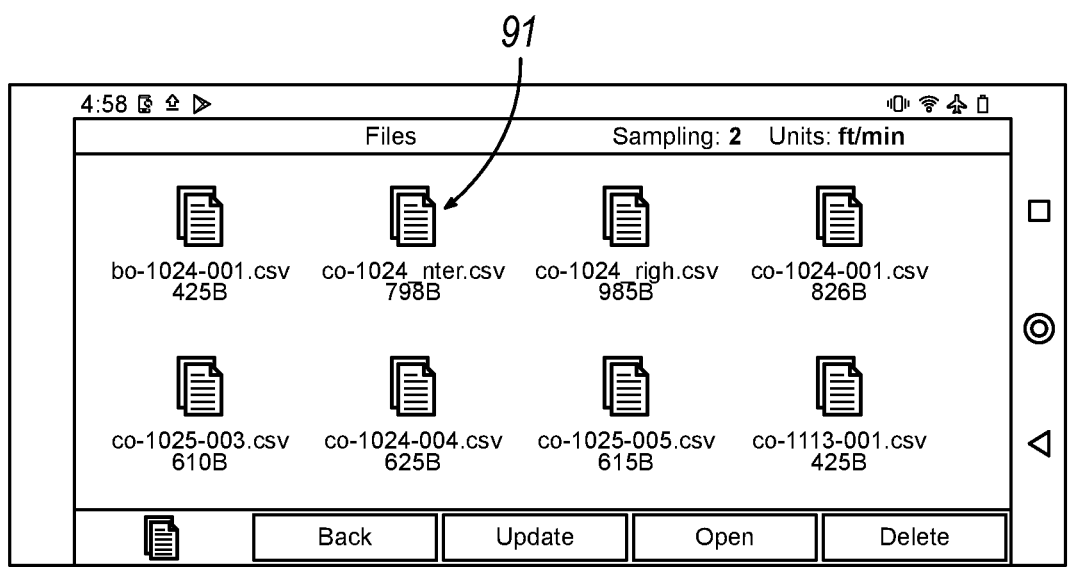

FIG. 14 depicts another portion of interface (80) having selectable icons for the various files (91) saved locally or accessible via device (10). This portion of interface (80) is accessed by selecting files (84) from the main screen of user interface (80) as shown in FIG. 7. In the present example, files (91) are listed with the name assigned at the time of saving files (91). As mentioned above, these data files (91) can be transmitted to other computing devices (61), including a cloud storage location, and one or more of computing devices (61) can execute various algorithms on the data within files (91) to generate analyses, data transformations, and reports. These outputs can be viewed on these or other computing devices (61) or on smart device (50). In this manner, and as described above, the collected data can be transmitted from smart device (50), processed remotely via other computing devices (61), and then output from the data received by smart device (50) for display. It should be noted that instead of data and output being transmitted and received from various devices, in some examples the data and output may not be transmitted or received, but instead accessed and displayed. In view of the teaching herein, various ways to access the data in files (91) to generate outputs and display such outputs will be apparent to those of ordinary skill in the art.

B. Exemplary Data Dashboards

Once device (10) has taken measurement readings to collect the data, and the data files have been uploaded to the network or cloud-based platform, the data is processed and analyzed as mentioned above, and various data visualization dashboards are generated. These dashboards illustrate the data, or transformations or manipulations of the data, in ways to help the user easily understand process performance and identify issues or areas of concern with the process that may need attention to improve or maintain desired process performance. In addition, in some cases smart device (50) or other computing devices (61) can be configured to receive alerts and notifications when airspeed readings breach upper or lower control limits. Such breaches may be illustrated in one or more of the dashboards.

Turning more specifically to FIGS. 15-18, FIG. 15 depicts an exemplary airspeed downdraft dashboard (100). The data shown is presented by position using a schematic representation of booth measurement locations (78). Dashboard (100) further includes an outline of booth (70), showing entrance (71), exit (72), and door (79). A downdraft average is also included, which represents the average downdraft for all measurement locations (78). Dashboard (100) further includes a color-coded change indication beneath each downdraft reading. This change indication in the present illustration appears as green with an upward arrow if the measurement value represents an increase from the prior measurement for the given measurement location (78). This change indication in the present illustration appears as red with a downward arrow if the measurement value represents a decrease from the prior measurement for the given measurement location (78). Dashboard (100) also includes crossdraft data at those locations where no downdraft data is collected or retained: entrance (71), exit (72), and door (79). As shown in dashboard (100), the presented data can be filtered by field including: (a) line, (b) process, (c) section, and (d) date.

Figure 16:
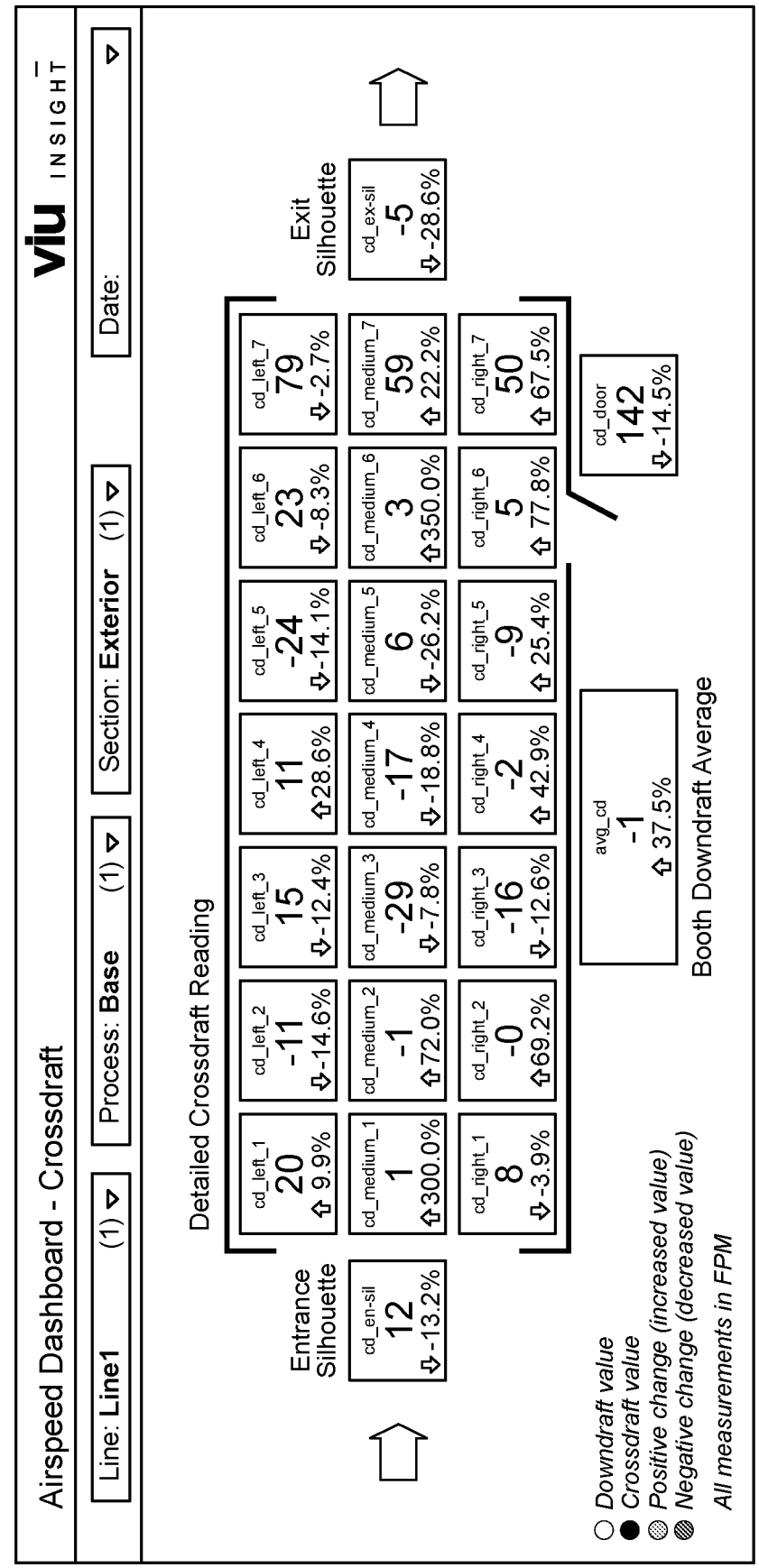

FIG. 16 depicts an exemplary airspeed crossdraft dashboard (110). The data shown is again presented by position using a schematic representation of booth measurement locations (78). Dashboard (110) also includes an outline of booth (70), showing entrance (71), exit (72), and door (79). A crossdraft average is included, which represents the average crossdraft for all measurement locations (78). Dashboard (110) further includes a color-coded change indication beneath each crossdraft reading. This change indication in the present illustration appears as green with an upward arrow if the measurement value represents an increase from the prior measurement for the given measurement location (78). This change indication in the present illustration appears as red with a downward arrow if the measurement value represents a decrease from the prior measurement for the given measurement location (78). Dashboard (110) also includes crossdraft data at entrance (71), exit (72), and door (79). As shown in dashboard (110), the presented data can be filtered by field including: (a) line, (b) process, (c) section, and (d) date.

Figure 17:
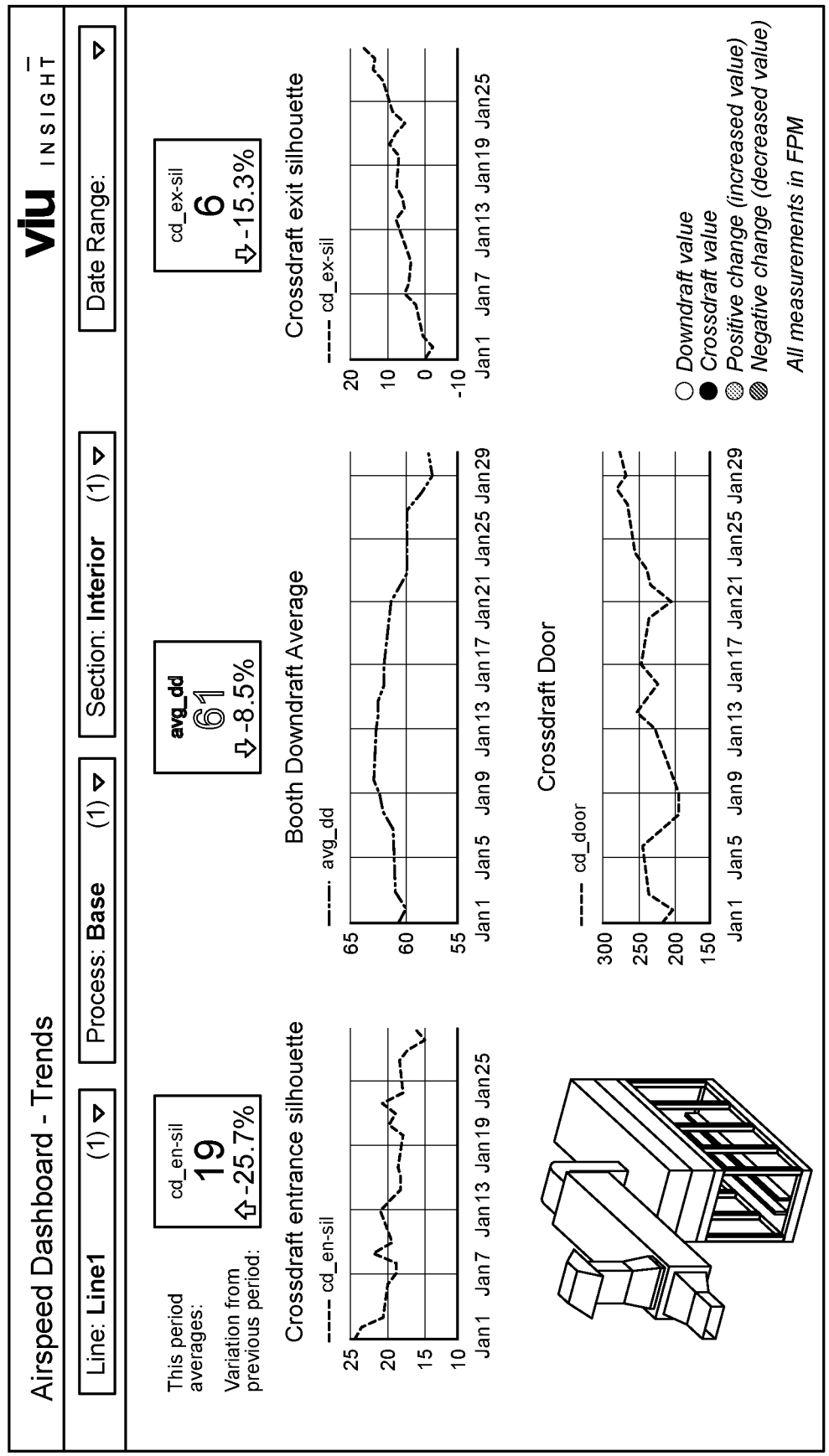

FIG. 17 depicts an exemplary airspeed trend dashboard (120). Dashboard (120) includes a date range for which data is shown over that time period. Dashboard (120) includes average data over the time period with trend charts for downdraft, crossdraft at entrance (71), crossdraft at exit (72), and crossdraft at door (79). Above the trend charts dashboard (120) includes an overall average for the time period along with the change shown using the color-coded convention described above. Similar to dashboards (100, 110), with dashboard (120) the presented data can be filtered by fields including: (a) line, (b) process, (c) section, and (d) date range.

Figure 18:
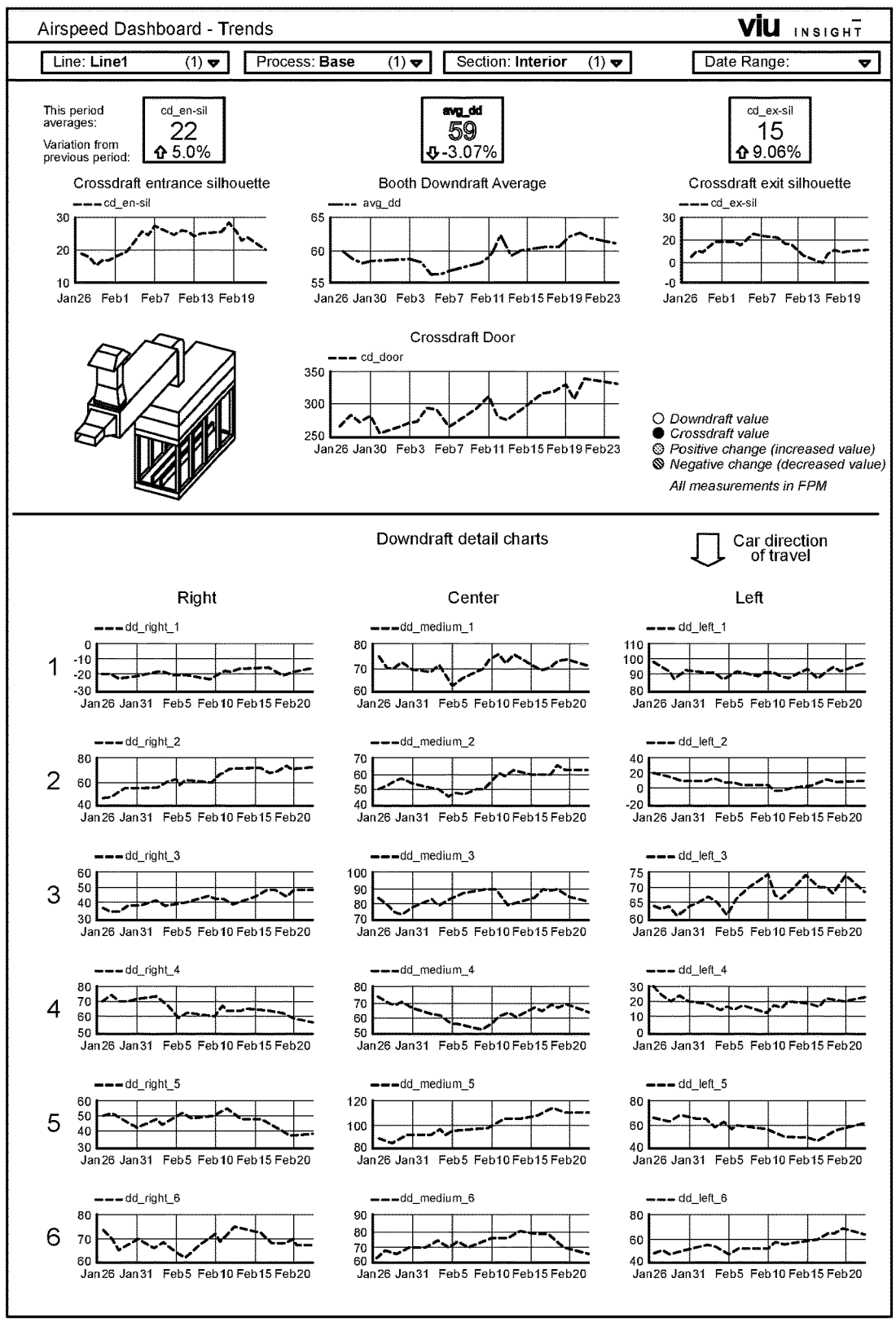

FIG. 18 depicts dashboard (130), which includes an option for detailed trend charts by measurement location (78). For instance, in the example of FIG. 18, trend charts are shown for downdraft data across measurement locations (78) including the center region, right region, and left region. Further in the present example the matrix used was a 6×3 and the trend charts are shown for each of the 6 rows. In this fashion, these trend charts can be traced or tracked back to the associated booth measurement location (78). The upper portion of dashboard (130) repeats the content of dashboard (120). With dashboard (130), this added detail trending can help illustrate if a particular measurement location (78) within booth (70) is trending in a way to suggest process troubleshooting or adjustment is needed to maintain or restore desired performance.

Figure 19:
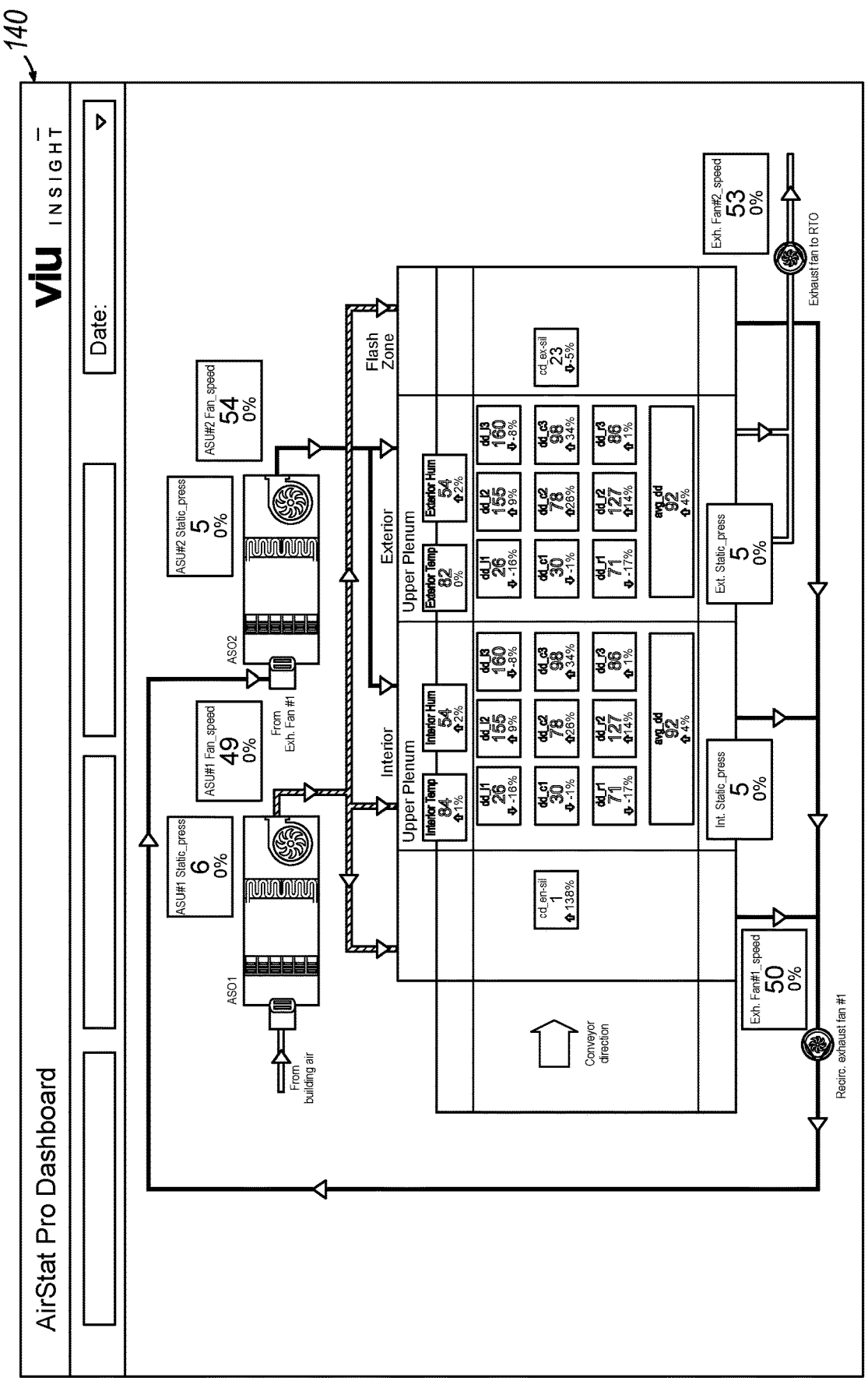

FIG. 19 depicts another exemplary dashboard (140). Dashboard (140) combines both measurement data from device (10) along with process parameters and information. With this view, an abnormality or outlier in the measurement data from device (10) can more easily be traced or attributed to a process parameter that may need troubleshooting or adjustment. In the present example, dashboard (140) shows an overlay of HVAC (73) components with booth (70) measurement data for airspeed. For instance, dashboard (140) integrates process data for fan speeds, exhaust fan speeds, temperature, humidity, filter differential pressures, among others. In view of the teachings herein, various modifications to dashboards (100, 110, 120, 130, 140), and other dashboard constructs usable with the data from device (10) will be apparent to those of ordinary skill in the art.

C. Exemplary Performance Metric

To have a balanced booth that performs well, the impact of multiple variables is considered as described above. With the data collection for both downdraft and crossdraft at multiple locations (78) and with multiple samplings at each location, there is a substantial amount of collected data to analyze for evaluating the performance or balance of the spray booth (70). With spray booth (70) and a spray process design, a target airspeed is defined at the outset. In some examples, this is expressed as a desired airspeed in FPM for the downdraft and ideally, 0 FPM for crossdraft. In determining performance of spray booth (70), in some examples, the average value for downdraft readings has been the main indicator of performance.

Figure 15:
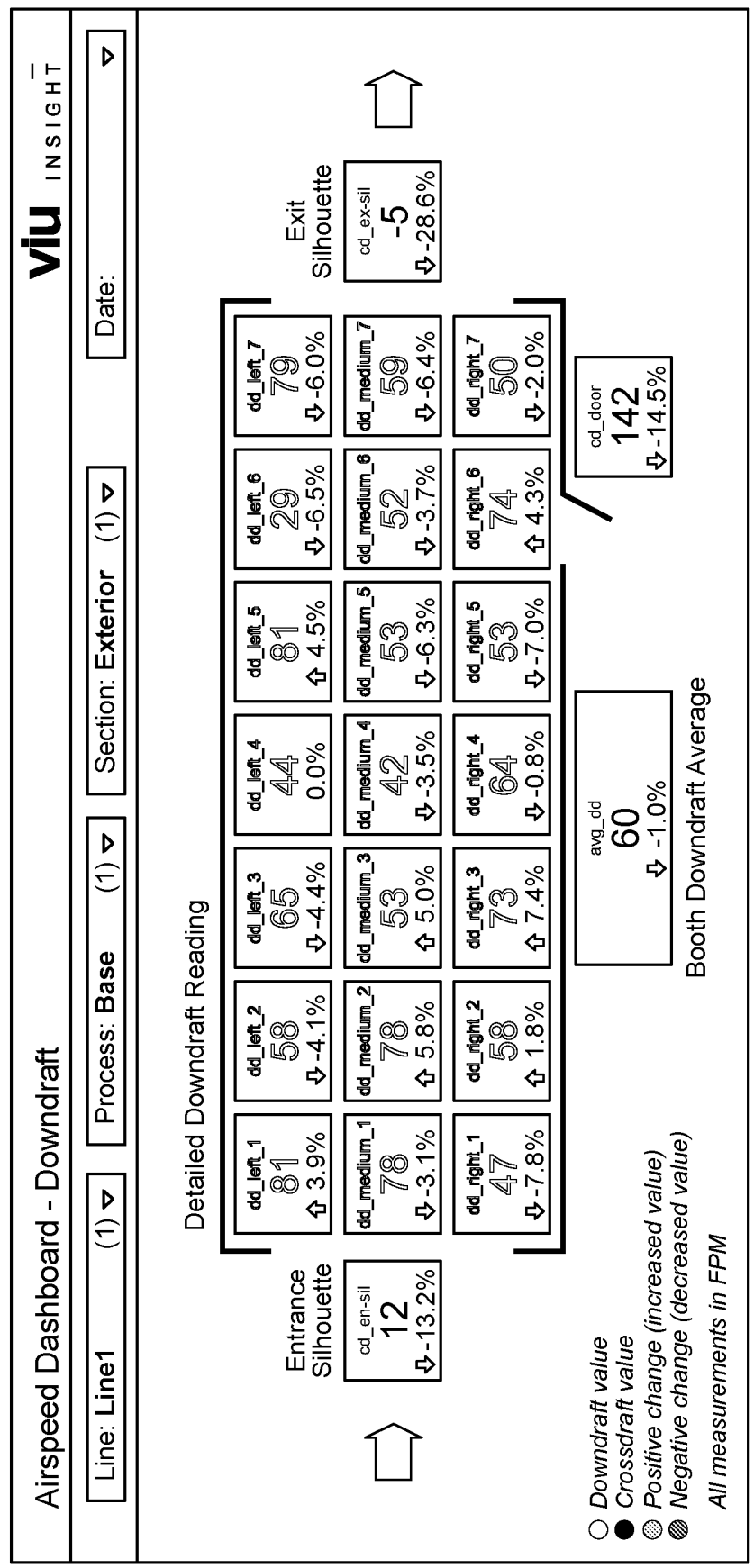
FIGS. 15-21 depict exemplary dashboards or visualizations of data collected and analyzed from the computing device of the air measuring device of FIG. 1 after use in the paint spray booth environment.
Figure 20:
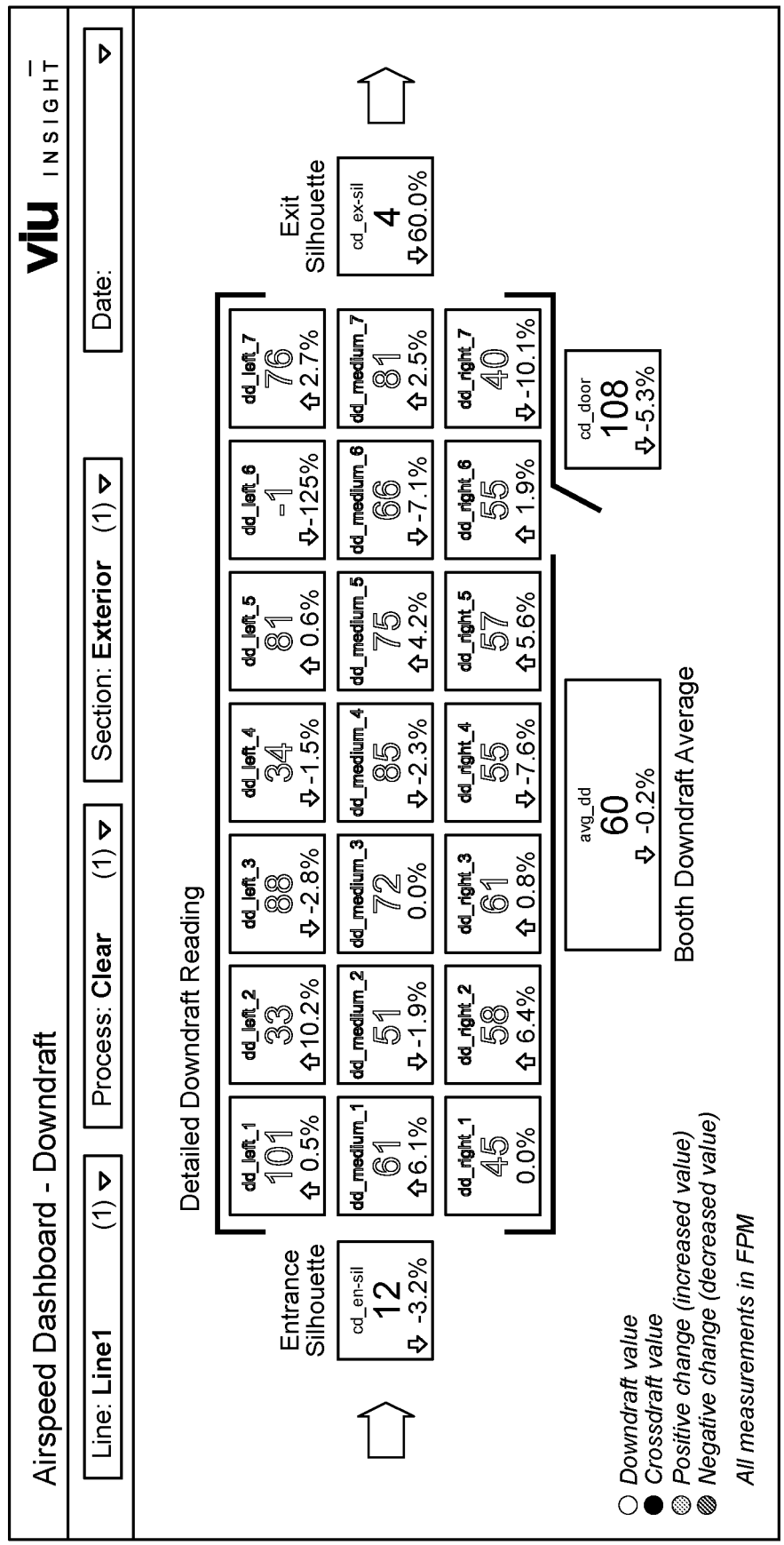

Focusing on the average downdraft alone can obscure the overall performance by compensating low values with high values, resulting in an average close to target, but that not necessarily corresponding with acceptable or optimum booth performance. In an example where spray booth (70) has a target downdraft of 60 FPM, referring to FIGS. 15 and 20, it is clear that the downdraft measurements average this 60 FPM target in each case. However, with FIG. 20, the data of dashboard (105) shows significant variations with values as high as 101 and as low as −1 (where air is actually flowing from the floor towards the ceiling). The variations in the data with FIG. 15 are less, meaning the data points are closer to the average or target. In this example, the booth associated with FIG. 15 is performing better than the booth associated with FIG. 20. In other words, the booth with FIG. 15 is said to have a better booth balance than the booth with FIG. 20. From these two examples, it is clear that the average downdraft value is not necessarily a meaningful indicator for booth performance or booth balance.

When considering an alternative performance indicator to average downdraft alone, the performance indicator should account for both positive and negative airspeed variations. If the specifications of a booth require 60 FPM, then downdraft data of 50 FPM and 70 FPM are equally missing the target. Instead of being cancelled mutually in an average calculation, they should both contribute to estimate the error. The mean squared error (MSE) can be used to represent how close a measurement is to a desired target. This is done by determining the distances from the measurement vectors for downdraft and crossdraft compared to the target. These distances represent the errors, and once determined are squared to remove any negative signs. The sum of all squared errors is then divided by the number of measurement points to obtain the mean. Equation 1 below is illustrative.

$$MSE = \frac{\sum_{1}^{n}(ActualDD - TargetDD)^2 - (ActualDD - TargetCD)^2}{n} \qquad \text{Equation 1}$$

Another way to describe the MSE and its application here is that MSE is used to find the average of a set of errors. Also, MSE gives more weight to larger differences. As mentioned above, the MSE provides the vector distance between the desired/specified airspeed and the actual value measured with device (10). It includes both axes, representing downdraft and crossdraft. In other words, it provides a way to combine the outputs shown for downdraft and crossdraft in FIGS. 15 and 16 for example.

By way of example, consider downdraft and crossdraft measurement data for two measurement locations in a booth (70) with a downdraft target of 60 FPM and crossdraft target of 0 FPM. Device (10) provides measurement data indicating an airspeed vector at the first measurement location that has a downdraft of 50 FPM and a negative crossdraft of −10 FPM. The airspeed vector at the second measurement location has a 70 FPM downdraft and a 10 FPM crossdraft. The error in airspeed for these vectors is calculated as follows:

$$\text{Square Error vector 1} = (50-60)\wedge 2 + (\cdot 10-0)\wedge 2$$
$$= 200$$
$$\text{Square Error vector 2} = (70-60)\wedge 2 + (10-0)\wedge 2$$
$$= 200$$
$$MSE = 400/2 = 200$$

MSE is a good estimator for the overall error in airspeed. However, to define whether booth performance or booth balance is acceptable or optimal the MSE calculation needs further refinement to understand if this overall error is acceptable or if the degree of error is great enough to warrant process corrective action. To achieve this refinement, the MSE results are normalized by comparing the measurement error with an acceptable variation. In some examples, the variation can be determined empirically, for instance by using device (10) to capture data when there are known process issues causing manufacturing defects and comparing that to the variation when the process is running without manufacturing defects. In view of the teachings herein, various ways to determine an acceptable variation will be apparent to those of ordinary skill in the art.

As mentioned above, the downdraft and crossdraft airspeed targets are predetermined. In addition to these targets, an acceptable variation is defined, which is considered to be the amount or degree of variation from target that is acceptable for both downdraft and crossdraft airspeeds. With this information, a new metric called Booth Performance Index (BPI) is determined and used to indicate whether a booth has good or poor performance considering all the measurements taken in the booth for downdraft and crossdraft. Equation 2 shows the BPI calculation below:

$$BPI = \sum_{1}^{n} \frac{\sqrt{(ActualDD - TargetDD)^2 + (ActualCD - TargetCD)^2}}{\sqrt{(VarDD^2 + VarCD^2)}} \quad \text{Equation 2}$$

With BPI, the denominator is the square of the quadratic error for the acceptable variability. In an example where the acceptable variation is the same for both downdraft and crossdraft, the denominator simplifies to $\sqrt{(2 \times V_{ar}^2)}$. BPI is a positive number which can start at 0 and have no theoretical limit.

Figure 21:
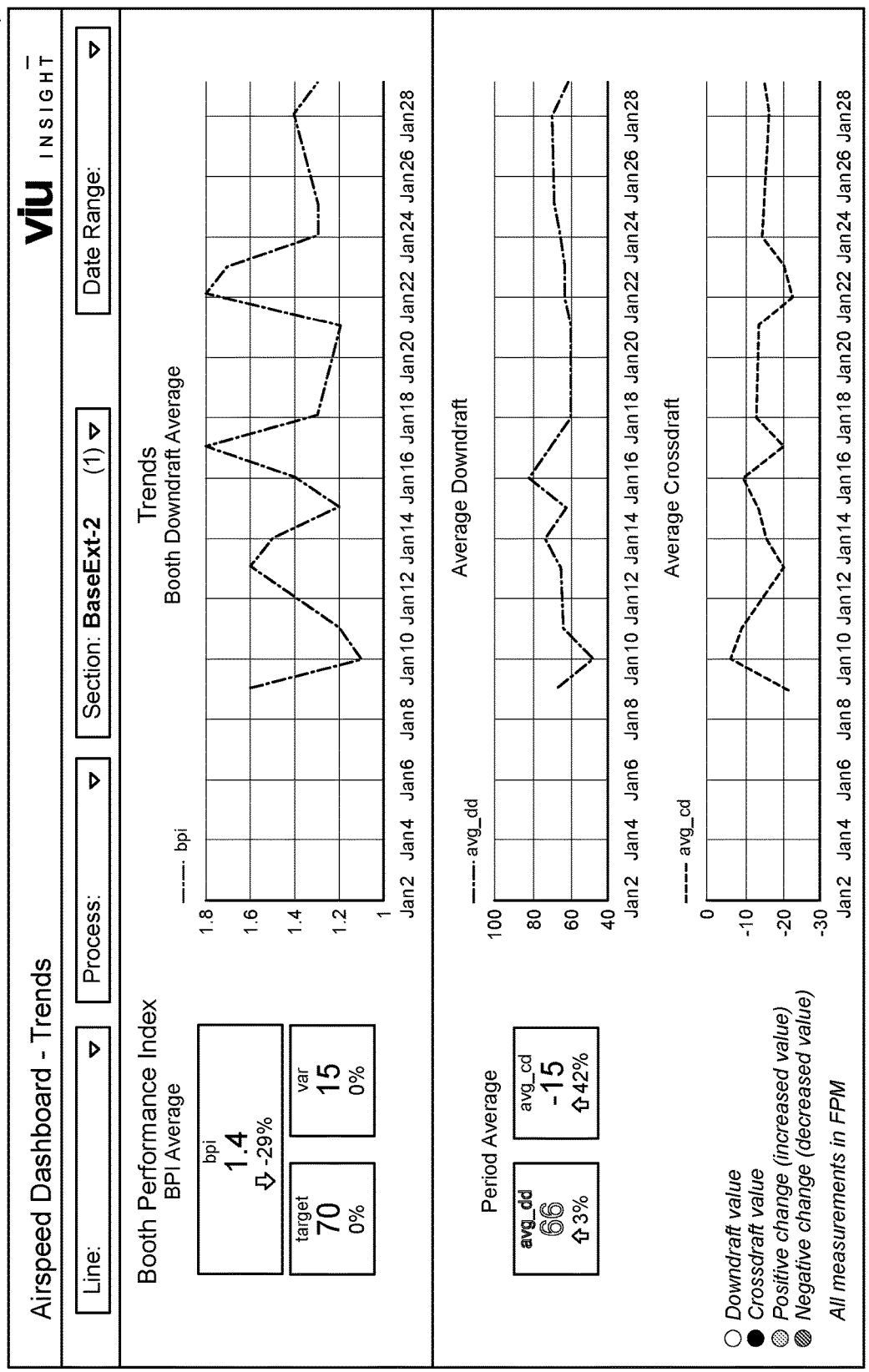

As mentioned above, design specifications for a spray booth typically call for a desired downdraft airspeed and minimum or zero crossdraft airspeed. However, as noted above, the design specifications can also include an acceptable variation in airspeed. If the airspeed measurement data is within the acceptable variation of the targets, then the airspeed within the booth is termed as acceptable or good for instance. FIG. 21 illustrates an exemplary dashboard (150) showing a current BPI data point along with a trend chart of past BPI data for a given spray booth. In the present example, BPI is calculated for every spray booth measurement. And BPI dashboard (150) is provided with the same filters described above to select different lines, processes and sections of the booth, as well as the date.

As mentioned above, the BPI metric or scale starts at zero, which represents the ideal scenario of airspeed readings matching design specifications at every measurement point and with zero crossdraft. A BPI of 1 represents the scenario where every measurement point in average, is equal to the target+/− the defined acceptable variability. The setting of this variability parameter is based on the process capabilities of the spray booth. In some examples, typical values for variability (Var) are 10 to 15 units. Not all processes are well designed and/or maintained, and even the desired variability (Var) may be out of the process capabilities. Based on historical data, and based on desired working conditions, plant engineering/production will need to define a threshold value which will define an acceptable working condition. In one example, this threshold value for BPI would be in the range of 1.5 or lower. In such an example, a spray booth operating with a BPI of 1—which is below the defined threshold—is considered as operating well. Conversely, a booth operating with a BPI of 2 or larger—which exceeds the predefined threshold—represents a booth with uneven air distribution and velocities, which does not match the desirable and specified laminar air flow in the spray booth.

D. Exemplary Method of Use with Spray Booth Application

Figure 22:
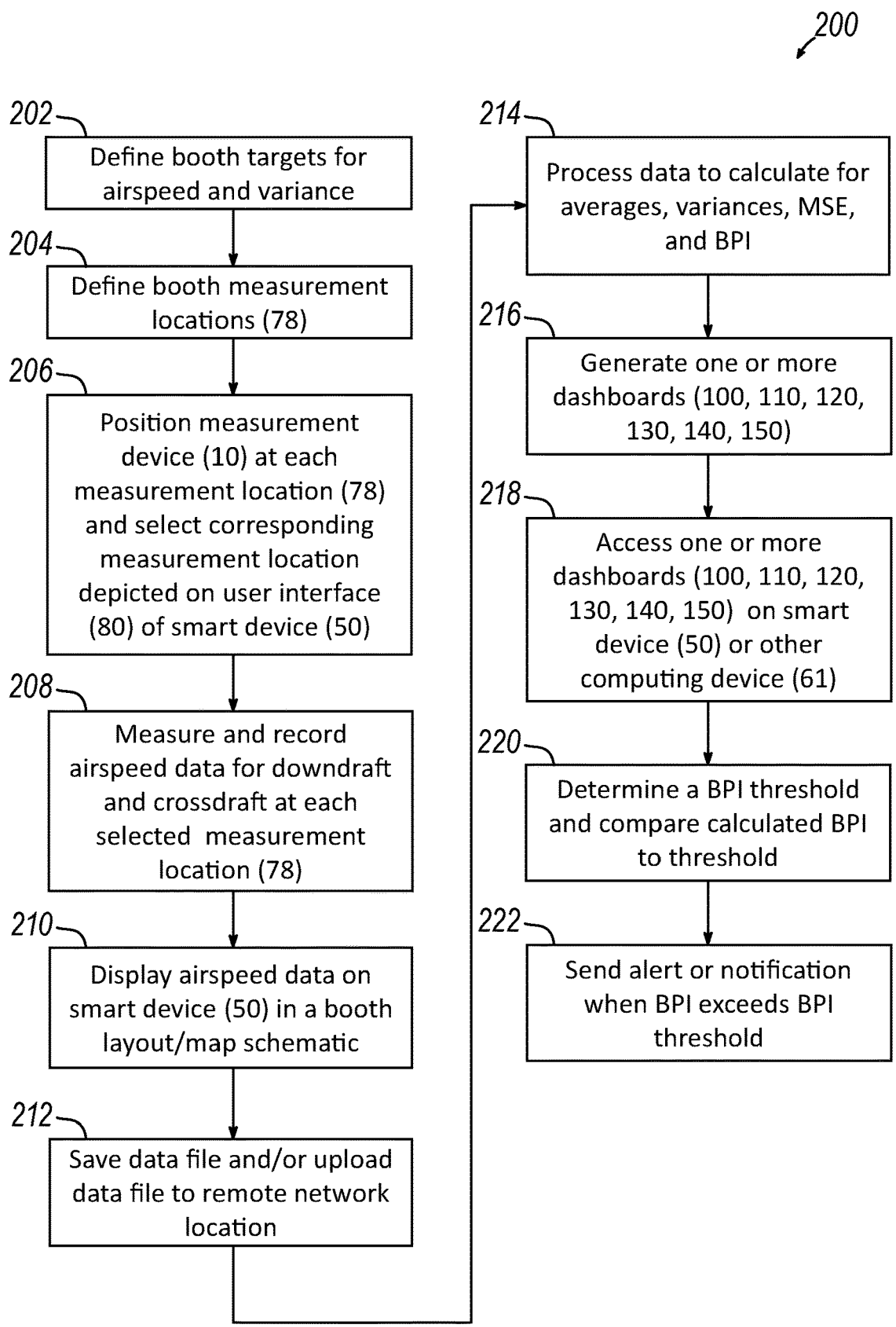
FIG. 22 depicts a block diagram of an exemplary method of using the air measuring device of FIG. 1 in the paint spray booth environment of FIG. 5.

FIG. 22 depicts an exemplary block diagram of a method (200) for monitoring and/or optimizing performance of a spray booth such as spray booth (70). At block (202), targets are defined for booth (70) in terms of downdraft airspeed, crossdraft airspeed, downdraft airspeed acceptable variance, and crossdraft airspeed acceptable variance. At block (204) measurement locations (78) are defined for booth (70). At block (206) measurement device (10) is positioned at each respective measurement location (78) and when at measurement location (78) the corresponding measurement location depicted on user interface (80) of smart device (50) is selected. At block (208) device (10) measures and records airspeed data for downdraft and crossdraft at each selected measurement location (78).

With the data collected, at block (210) the airspeed data is displayed on smart device (50), and in one example is displayed in a booth layout/map schematic that corresponds with measurement locations (78). At block (212) the data file is saved and/or uploaded to a network, which could be a local or remote network. For instance, in one example the data file is uploaded to a cloud storage location. At block (214), the data from the data file is processed to calculate averages, variances, MSE, and BPI statistics. At block (216) one or more of dashboards (100, 110, 120, 130, 140, 150) are generated, and at block (218) these dashboards are accessed on smart device (50) or another computing device (61). As mentioned above, in some cases electronic dashboard files are transmitted to smart device (50) or other computing devices (61) and then accessed, while in other cases the electronic dashboards are accessed from a remote location by smart device (50) or other computing devices (61).

At block (220), a threshold for BPI is determined and then compared with the calculated BPI. For example, in one version the threshold may be set at 1.5 and the calculated BPI value is 1.7. At block (222) where the calculated BPI exceeds the BPI threshold, an alert or notification is sent to smart device (50) or another computing device (61). In some instances, the alert or notification is sent as an email to a registered email address or as a text message to a registered phone number.

In view of the teachings herein, other methods and modifications to method (200) for use with device (10) in a spray booth application will be apparent to those of ordinary skill in the art. It should be noted that the steps shown and described with respect to method (200) may be completed in any order and thus the method is not required to proceed sequentially as illustrated by the arrow progression in FIG. 22. Furthermore, it should be understood that not all steps are required to be completed in each application or use of method (200).

III. Exemplary Healthcare/Medical Application(s)

Other applications where device (10, 1010) can be used is with healthcare operations, e.g., patient rooms, operating rooms, exam rooms, etc. By way of example, a patient room may be configured as an isolation room to prohibit or minimize contact between the patient and others. This may be the case when a patient is in an infectious state or when the patient is at a risk for contracting an infection from others. Patient rooms may include a main room, an anteroom, and a toilet room. The anteroom separates the main room from a public space such as a corridor or hallway. An HVAC system associated with the patient room provides fresh air or conditioned air to the room. Depending on the placement of HVAC system components, air may be directed within the patient room in a variety of ways.

In this and other healthcare environments, device (10, 1010) is configured to measure airspeed as described above—measuring airspeed in the downdraft (DD) and crossdraft (CD) directions. With patient rooms configured as isolation rooms, it is desirable to have a region defined as a clean air region and a region defined as a dirty air region. Other terms may be used to describe these regions, such as upstream and downstream regions or other suitable terms. In the present example, where a patient is infectious, medical personnel and other treating and caring for the patient would be positioned in the clean air region. This would reduce the risk of these medical personnel and others tending to the patient acquiring the illness affecting the patient. In another context such as an operating room, it may be desirable to have surgical instruments and tools placed in a clean room region of the operating room.

When considering targets for downdraft airspeed and crossdraft airspeed in a healthcare environment, one objective is to maintain laminar airflow and thereby eliminate turbulent airflows within the environment. In one example of a patient room or operating room, it is desirable to have a downdraft airspeed target of 60 FPM and a crossdraft airspeed target of 0 FPM. Still in other versions, these targets may be greater or less, however, airflow performance is largely based on deviation from target rather than the numerical values of the targets themselves.

A. Exemplary User Interface and Operating Modes

In using device (10, 1010) in the healthcare environments mentioned above, a plurality of measurement locations are determined. When using device (10, 1010), a user would position themselves to position sensor assembly (20) at each of the measurement locations. When positioned in this manner, device (10, 1010) is activated to obtain data in terms of airflow direction and speed. Specifically, device (10) is aligned such that the data obtained provides an air speed for downdraft and crossdraft at each measurement location. Device (10, 1010) is further configured such that it may collect and report any number of data samples at each location. For instance, in some examples a single measurement may be taken at each location. Still in other versions, three measurements may be taken at each location and the average of the three measurements reported for the given location.

Referring to FIGS. 24-32, a user interface (380) of smart device (50) is shown. With user interface (380), various options are selectable by the user. Some of these options represent various modes for use of device (10, 1010). For instance, one such mode is a continuous mode (381). In continuous mode (381), device (10) will read airspeed in a continuous manner at a rate of 1 reading per second. Based on the desired sampling number—which can be set in the settings (382) option—the sampling will average the selected number of measurements and save that calculated value. By way of example only, if sampling is set to five, the device will get five consecutive measurements, one per second, and calculate and save the average at the end of the five second period The average reading will be displayed as downdraft and crossdraft as identified by directional arrows (383). When finished, this data is saved in a local file that can be accessed under the files (384) option. After saving the value, the application will automatically restart the reading of the next five values. This continuous measurement cycle will continue until the user taps Stop on the screen.

Another mode of operation is random mode (385). Under this reading mode, the user will collect readings without any predefined pattern or frequency. When "Read" is selected, the application will take as many samples as defined in the sampling settings and calculate the average for both downdraft and crossdraft. Those values will be displayed on the screen with directional arrows (383). From here the user may select "Save" to save the already captured measurements, or select "Next" to take a new reading. As the user continues to make new readings by selecting "Next," new rows of data points will be added to the table. When finished, this data can be saved in a local file that can be accessed under the files (384) option.

Another mode of operation is OR mode (386). In this mode a predefined layout of data points is used. This predefined layout of data points corresponds with measurement locations as described above and shown in the user interface as measurement locations (378). In the present example, the layout of measurement locations (378) includes five rows of three measurement locations (378) for a total of 15 measurement locations (378). For the readings, any number of measurements may be taken at each measurement location (378), with the averages reported. In other examples, other matrices of measurement locations (378) can be used. In view of the teachings herein, various other layouts of measurement locations (378) to be used in OR mode (386) will be apparent to those of ordinary skill in the art.

After selecting OR mode (386), in some versions the application presents a configuration screen to select information including: facility, floor, room, etc. The options available for these fields are predefined in the configuration file that is or can be imported in settings (382). The user selects an option for each field. Following this, the user interface displays an operating room layout or map (387). The user can then select the location (378) where to perform the next measurement and then tap "Read" on the screen. Once the reading is completed, values for downdraft and cross draft are associated with the selected location (378) and saved.

Figure 33:
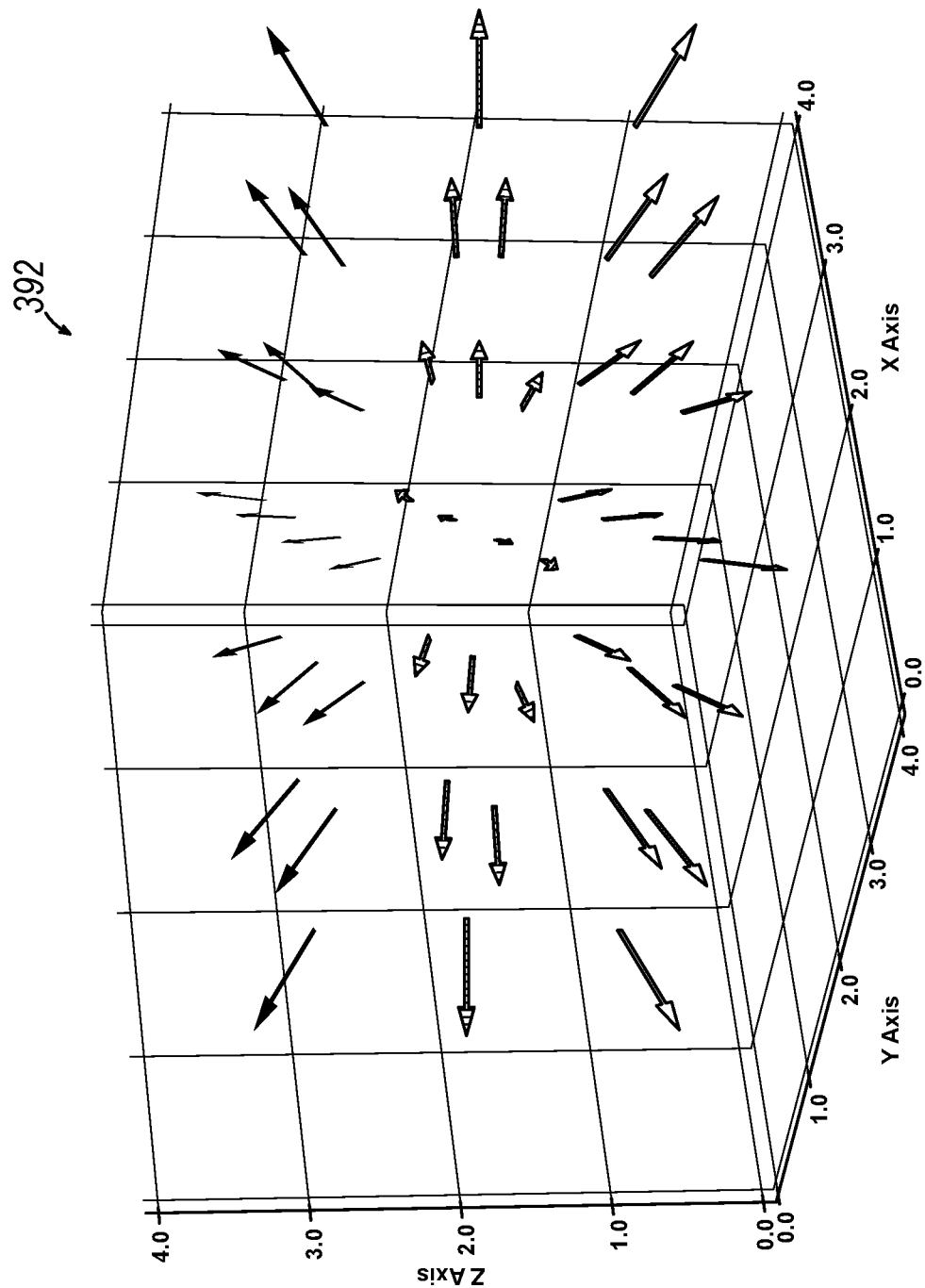
FIG. 33 depicts an exemplary interface graphically displaying a three-dimensional airflow model generated from the data collected by the device of FIG. 1.

Another mode for taking readings and collecting data is OR 3D mode (388). In this mode, you can perform a reading similar to the OR mode (386). However, with OR 3D mode (388), the user positions device (10, 1010) in a longitudinal and transverse orientation and takes measurements at each identified measurement location (378). With OR 3D mode (388) measurement locations (378) are presented as a 4×4 matrix with a sampling of 10 readings per measurement location (378). In this manner, the user can perform a detailed mapping of the airspeed in the operating room. In one example of OR 3D mode (388), readings are taken at measurement locations (378) as shown, but readings are taken at multiple heights for each measurement location (378). By adding in multiple heights, a representation, model, or map of the three-dimensional airflow within the environment can be created. An exemplary 3D airflow model is depicted in FIG. 33.

Figure 24:
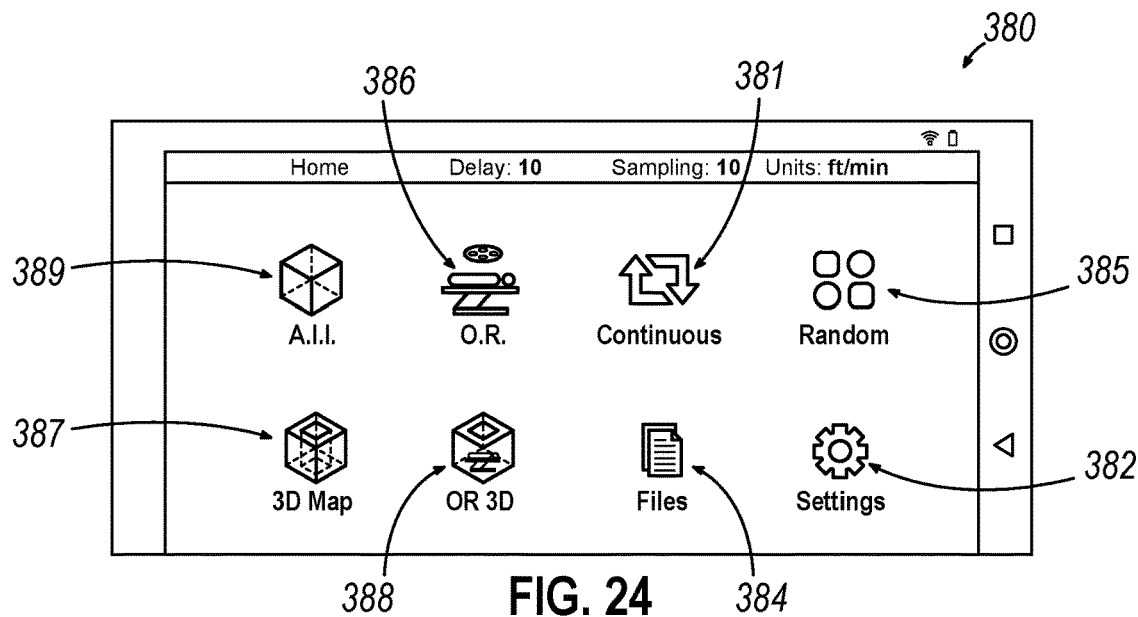
FIGS. 24-32 depict exemplary user interfaces of the computing device of the air measuring device of FIG. 1 usable in a healthcare use environment, the user interfaces configured to receive inputs from a user and display data to the user.
Figure 25:
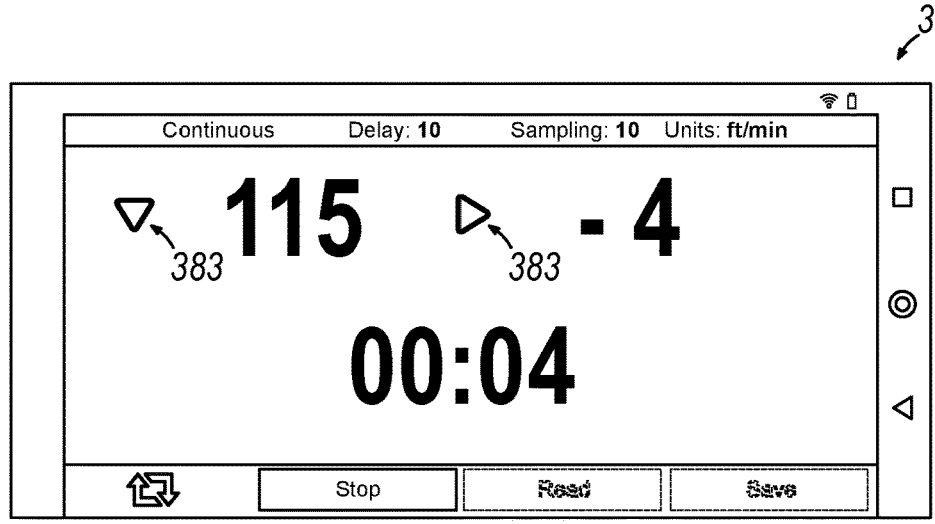
Figure 26:
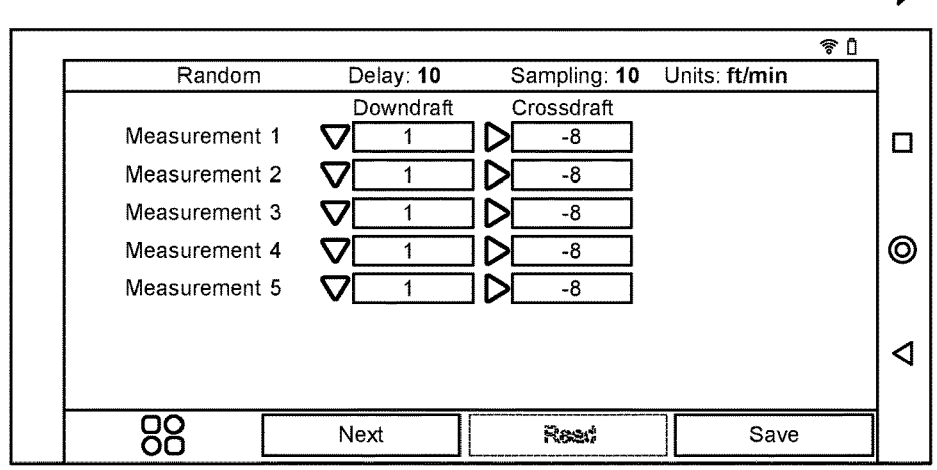
Figure 27:
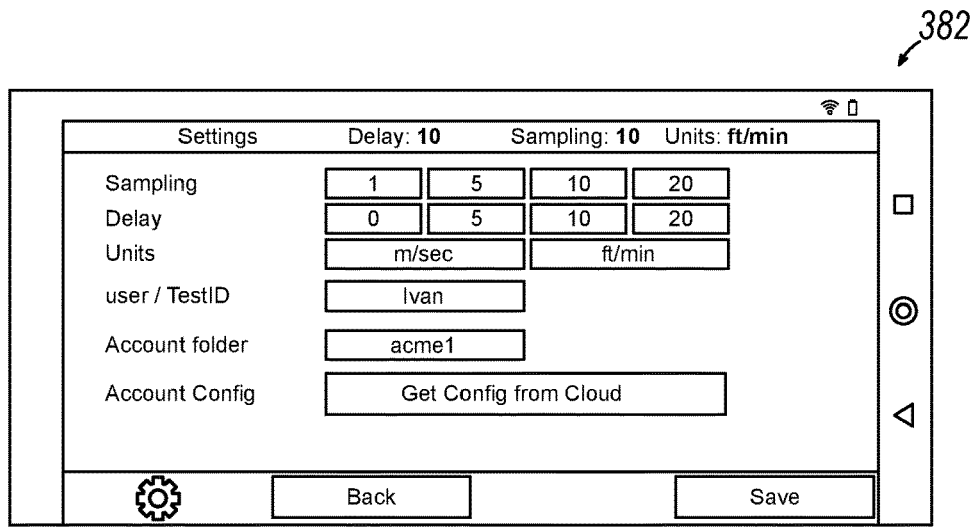
Figure 28:
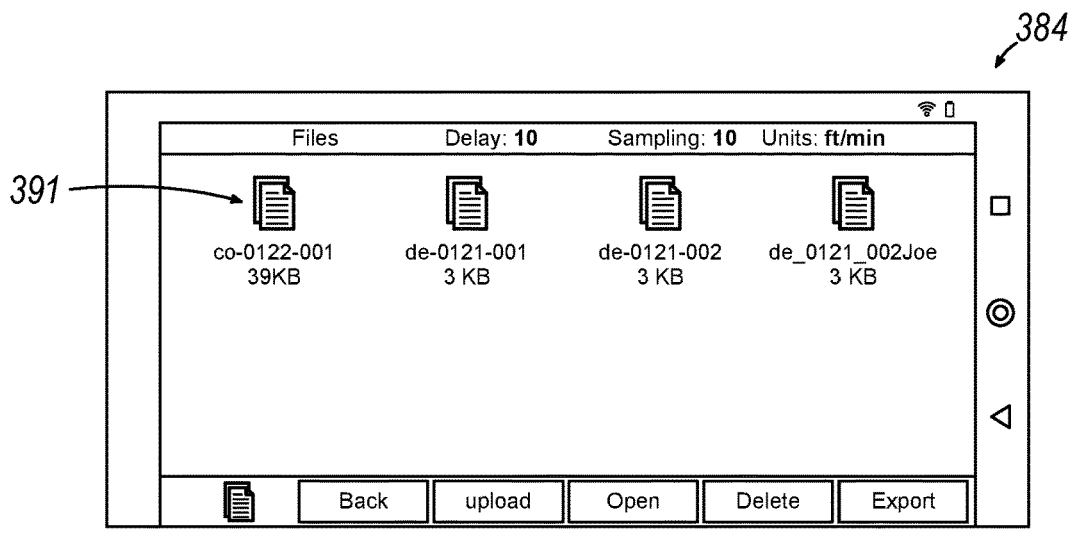
Figure 29:
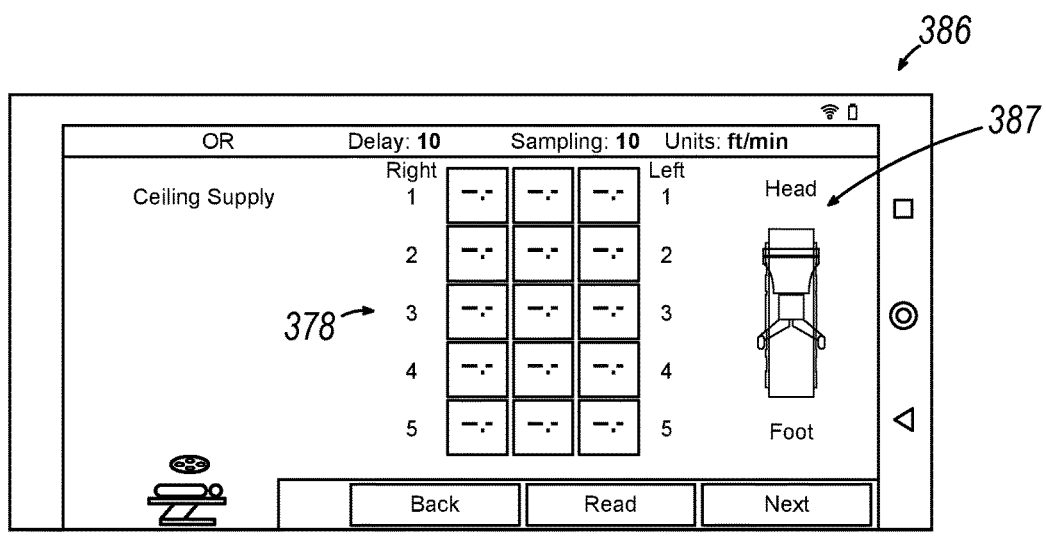
Figure 30:
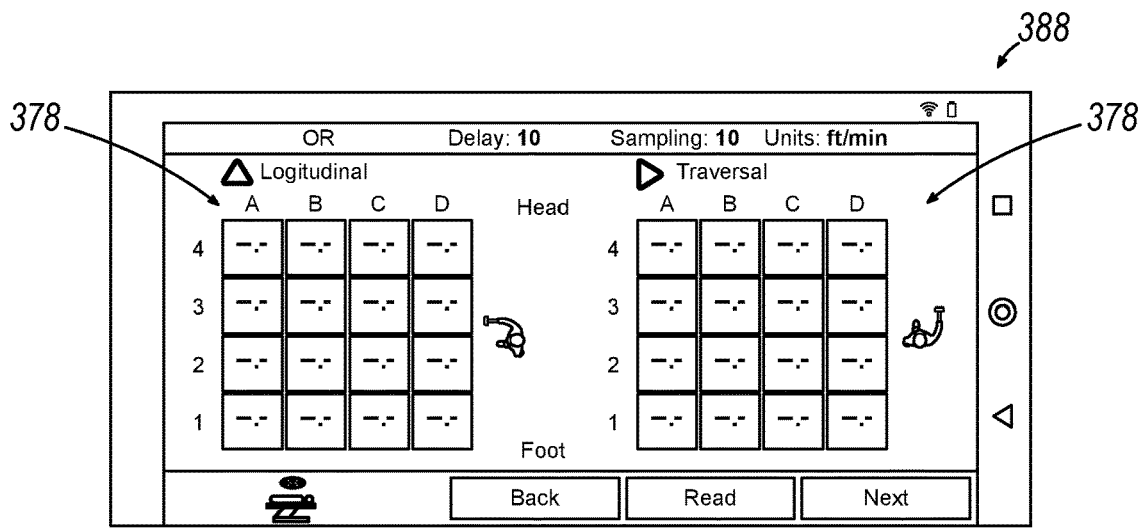

FIG. 28 depicts another portion of interface (380) having selectable icons for the various files (391) saved locally or accessible via device (10, 1010). This portion of interface (380) is accessed by selecting files (384) from the main screen of user interface (380) as shown in FIG. 24. In the present example, files (391) are listed with the name assigned at the time of saving files (391). As mentioned above, these data files (391) can be transmitted to other computing devices (61), including a cloud storage location, and one or more of computing devices (61) can execute various algorithms on the data within files (391) to generate analyses, data transformations, and reports. These outputs can be viewed on these or other computing devices (61) or on smart device (50). In this manner, and as described above, the collected data can be transmitted from smart device (50), processed remotely via other computing devices (61), and then output from the data received by smart device (50) for display. It should be noted that instead of data and output being transmitted and received from various devices, in some examples the data and output may not be transmitted or received, but instead accessed and displayed. In view of the teaching herein, various ways to access the data in files (391) to generate outputs and display such outputs will be apparent to those of ordinary skill in the art.

Figure 31:
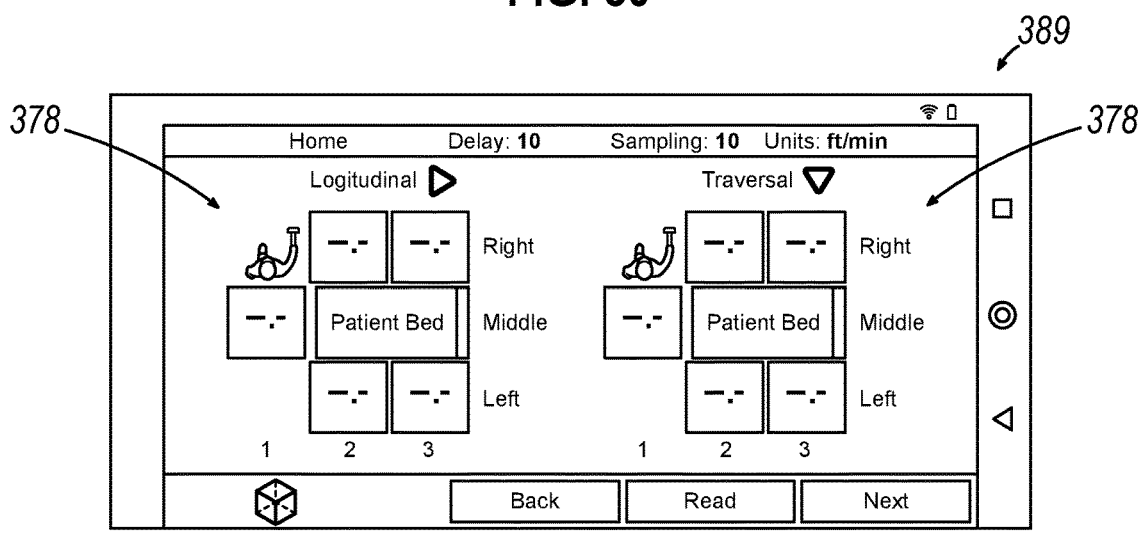

Another mode of user interface (380) is infectious isolation room mode (389) as depicted in FIG. 31. Infectious isolation room mode (389) is sometimes referred to herein as A.I.I. mode or airborne infectious isolation mode. However, it should be understood that this mode is usable for with environments having airborne infectious diseases as well as non-airborne infectious diseases. As shown in FIG. 31, in this infectious isolation room mode (389), measurement locations (378) are taken at five locations generally adjacent to the patient bed within the room. Additionally, device (10, 1010) is used to take measurements or readings at these five locations with device (10, 1010) oriented in a longitudinal manner as well as a transverse manner as shown in FIG. 31. As will be described further below, the collected data will allow for regions to be defined within the isolation room to better protect patients and/or medical and caretaker personnel from exposure to an infection.

Figure 32:
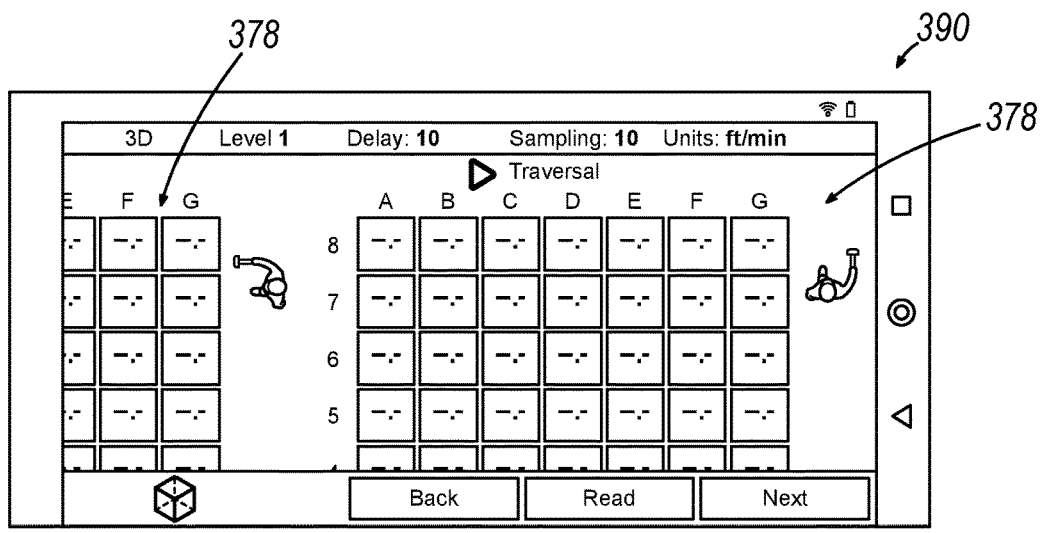

Another mode of user interface (380) is three-dimensional map mode or 3D map mode (390) as depicted in FIG. 32. Similar to 3D OR mode described above, 3D map mode (390) includes several measurement locations (378) within a given environment. In the example of FIG. 32, measurement locations (378) comprise a matrix of 8×7 such that there is a total of 56 measurement locations (378) from which device (10, 1010) is used for measuring or reading airspeed. Furthermore, as reflected in FIG. 32, measurements are taken with device (10, 1010) oriented longitudinally as well as with device (10, 1010) oriented transverse. In some versions of 3D map mode (390) additional measurement locations are used by using the same measurement locations (378) as illustrated in FIG. 32 but repeating the measurements at multiple heights within the environment. For instance, device (10, 1010) may be used with a positioning member such as positioning member (1020) to change the height from which device (10, 1010) captures measurements. With the collection of this airspeed data, either with or without the multiple height data points, analyses are performed to generate a three-dimensional airflow model or map (392) for the environment. Such a map may be illustrated graphically as shown in FIG. 33, but other ways to illustrate the airflow model or map can be used in other versions.

B. Exemplary Data Dashboards

Once device (10, 1010) has taken measurement readings to collect the data, and the data files have been uploaded to the network or cloud-based platform, the data is processed and analyzed as mentioned above, and various data visualization dashboards are generated. These dashboards illustrate the data, or transformations or manipulations of the data, in ways to help the user easily understand process performance and identify issues or areas of concern with the process that may need attention to improve or maintain desired process performance. In addition, in some cases smart device (50) or other computing devices (61) can be configured to receive alerts and notifications when airspeed readings breach control limits or thresholds. Such breaches may also be illustrated in one or more of the dashboards.

Figure 34:
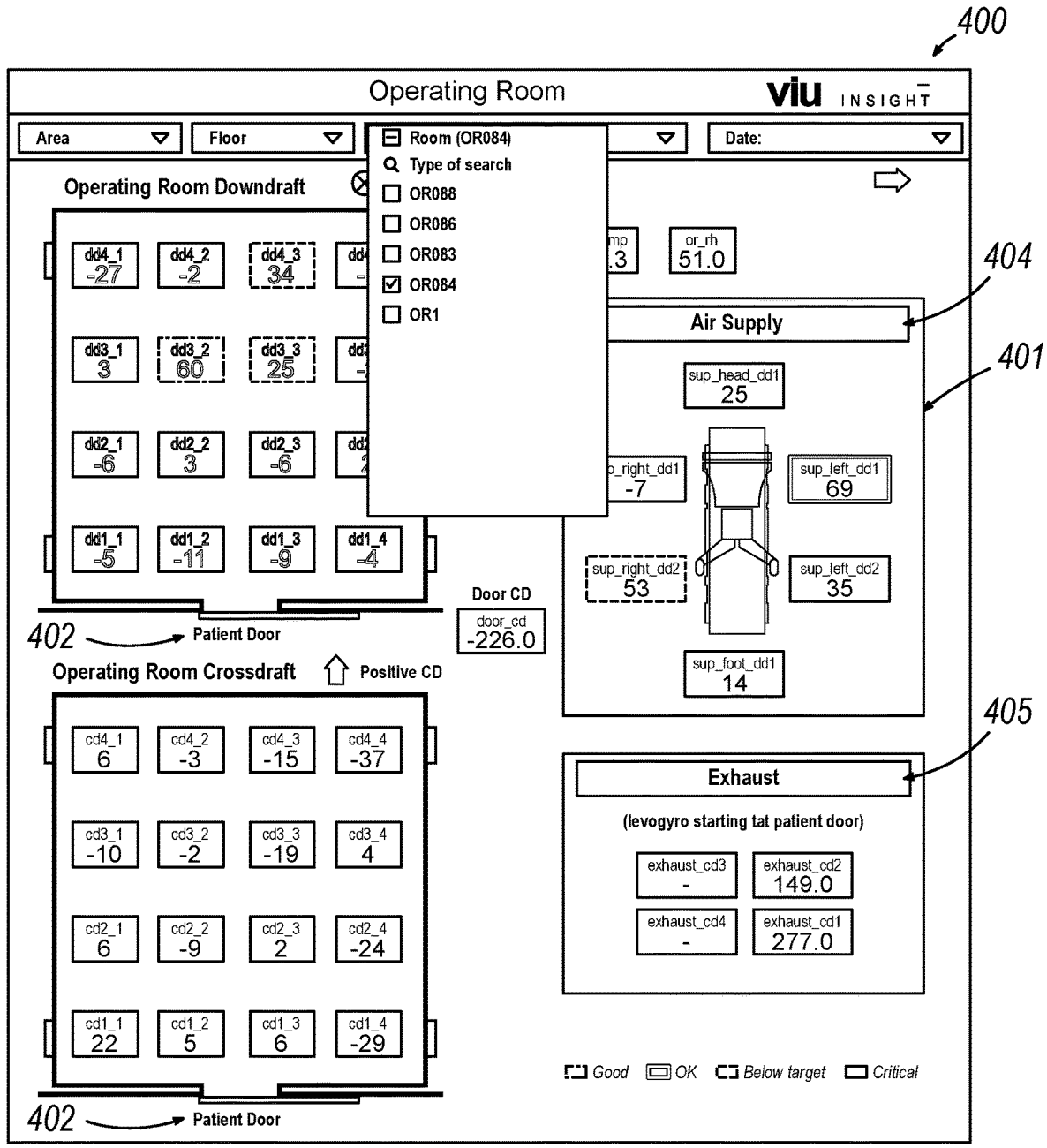
FIGS. 34-35 depict exemplary dashboards or visualizations of data collected and analyzed from the computing device of the air measuring device of FIG. 1 after use in the healthcare use environment.

FIG. 34 depicts an exemplary airspeed dashboard (400) for the operating room environment. The data shown is presented by position using a schematic representation of measurement locations (378). Based on the collected data, a user can identify airflow patterns within the operating room and then take this information into consideration in determining optimum room layout where applicable or possible based on given operating room constraints. Instead of, or in addition to, determining and controlling layout of the room, specific HVAC system adjustments can be made to make the operating room safer for the patient or those exposed to the patient. For example, with operating rooms having unidirectional airflow is desirable. In particular, a consistent downdraft with minimal crossdraft is desired in some instances. By way of example only, and not limitation, a target downdraft for an operating room may be in the range of 50 FPM to 70 FPM with a crossdraft target of 0 FPM or minimal crossdraft where 0 FPM is not attainable.

Another aspect of operating rooms to consider is the airflow around critical areas of the operating room that may be separate from the patient and operating table. For instance, the instrument table where instruments and supplies are placed for use in the procedure is an environment where it is desired to reduce the risk of contamination. Accordingly, the location of the instrument table, or the HVAC system can be adjusted such that the instrument table is located on the clean air side of the room. In view of the teachings herein, other ways to configure an operating room or an HVAC system for an operating room based on the data provided by device (10) will be apparent to those of ordinary skill in the art.

Referring to dashboard (400) more specifically, dashboard (400) includes an outline of the operating room (401), showing an entrance/exit (402), operating table (403), air supply (404) and air exhaust (405). Dashboard (400) includes a color-coded indication for each downdraft reading to indicate if a given reading is considered good, okay, below target, or critical. This assessment considers the deviation of the reading from a target value for downdraft airspeed. In some instances, the mean square error analysis or other mathematical analysis is used to make this assessment. Dashboard (400) also includes crossdraft data, including crossdraft data at those locations where no downdraft data is collected or retained such as at entrance/exit (402) and air exhaust (405). As shown in dashboard (400), the presented data can be filtered by area, floor, operating room and date.

Figure 35:
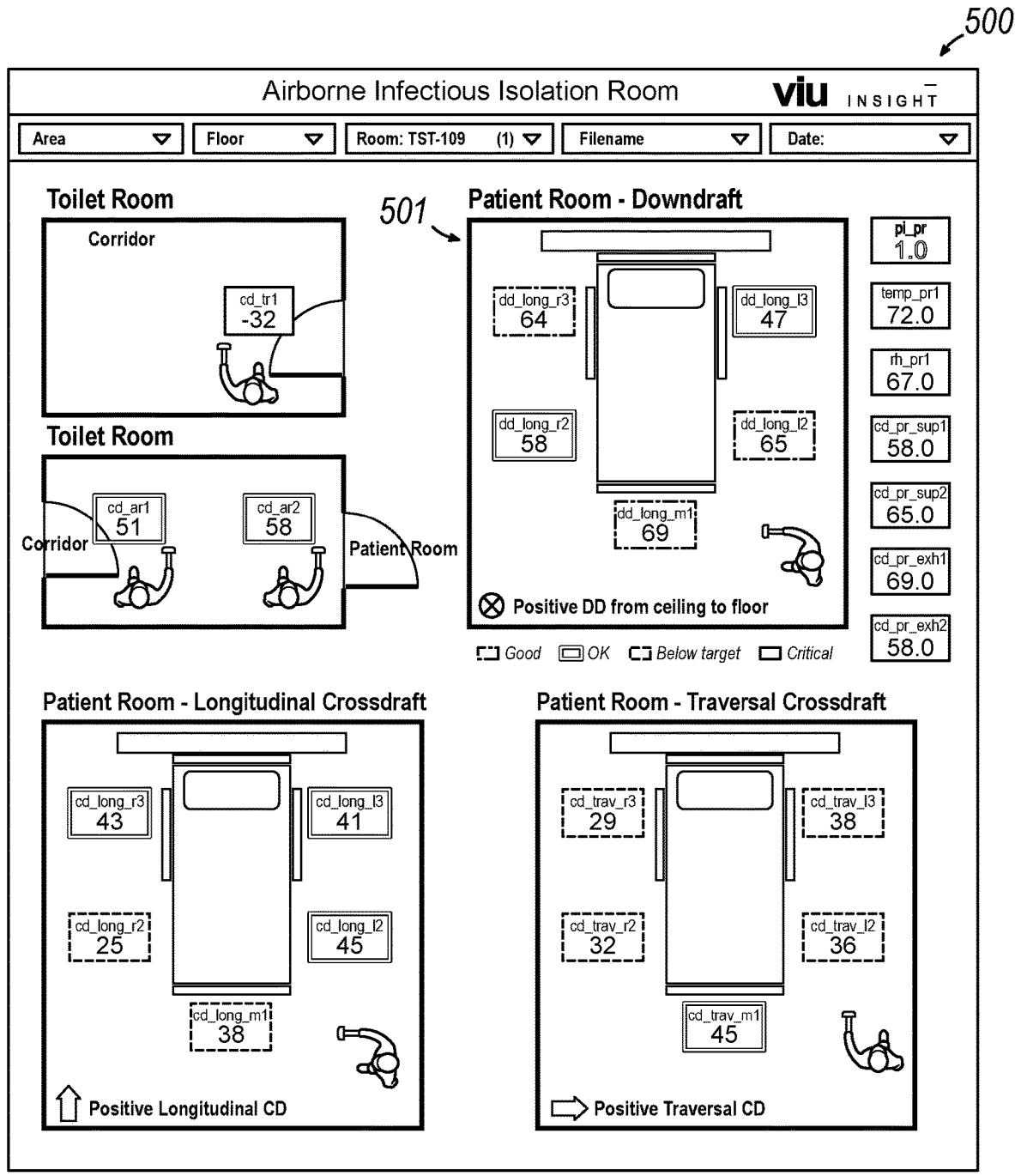

FIG. 35 depicts an exemplary airspeed dashboard (500) for the patient room environment. The data shown is again presented by position using a schematic representation of measurement locations (378) within the patient room. Dashboard (500) includes an outline of a patient room (501). As mentioned above, in one example the patient room may be an isolation room meant to separate a patient from others, either because the patent themselves may be infectious to others or because the patient may have a compromised immune system and be sensitive to becoming ill from exposure to others. An aim with collecting and analyzing this data is to reduce the risk of subjecting the patient or visitor or medical professional (as the case may be) to contamination. For example, based on the collected data, a user can identify airflow patterns within the patient room and then take this information into consideration in determining optimum room layout. For instance, in the case where the patient is infectious to others, understanding the airflow allows visitors and medical professionals seeing the patient to present themselves or approach the patient from a position where the air flows toward the patient instead of from the patient to the visitor or medical professional. In this example, the terms "clean air side" and "dirty air side" or "less clean air side" may be used to identify or describe the airflow, where the air flows from clean air to dirty air. In the infectious patient scenario, the patient would be on the dirty air side, or downstream from the clean air side where the healthy visitor or medical profession would be located. In the compromised immune system patient scenario, the patient would be on the clean air side with the visitor or medical professional downstream on the dirty air side.

Additionally, instead of, or in addition to, determining and controlling layout of the room, specific HVAC system adjustments can be made to make the room safer for the patient or those exposed to the patient. This may be an approach used where altering room layout may not be possible or practical based on other factors like access points, equipment location, etc. For example, with a patient isolation room, or possibly with patient rooms generally, in one example it is desirable to have unidirectional airflow from the clean air side to the dirty air side. Therefore, measuring, analyzing, and adjusting crossdraft airflow can be a way to verify and control to this desired state. In view of the teachings herein, other ways configure a patient room or an HVAC system for a patient room based on the data provided by device (10, 1010) will be apparent to those of ordinary skill in the art.

C. Exemplary Performance Metric

To have a healthcare environment, e.g. a patient room or operating room, that performs well in terms of airflow within the environment, the impact of multiple variables is considered as described above. With the data collection for both downdraft and crossdraft at multiple locations (378) and with multiple samplings at each location, there is a substantial amount of collected data to analyze for evaluating the performance or balance of the healthcare environment. Similar to the spray booth environment described above, with a healthcare environment a target airspeed is defined at the outset for downdraft and crossdraft. Also, an acceptable variation in airspeed is defined. If the airspeed measurement data is within the acceptable variation of the targets, then the airspeed within the environment is termed as acceptable or good for instance. With this approach, a method of determining airflow performance can be as described above with respect to spray booth (70) where a performance index threshold is defined, a performance index is calculated, and then the two are compared to determine a performance condition. With a desire to define regions of airflow within the healthcare environment to position patients and/or medical staff or visitors in the environment, the performance assessment may account for a trying to maintain a desired crossdraft airflow such that air flows in a laminar fashion from a clean air side to a less clean air side as explained above.

D. Exemplary Method of Use with Healthcare Application(s)

Figure 36:
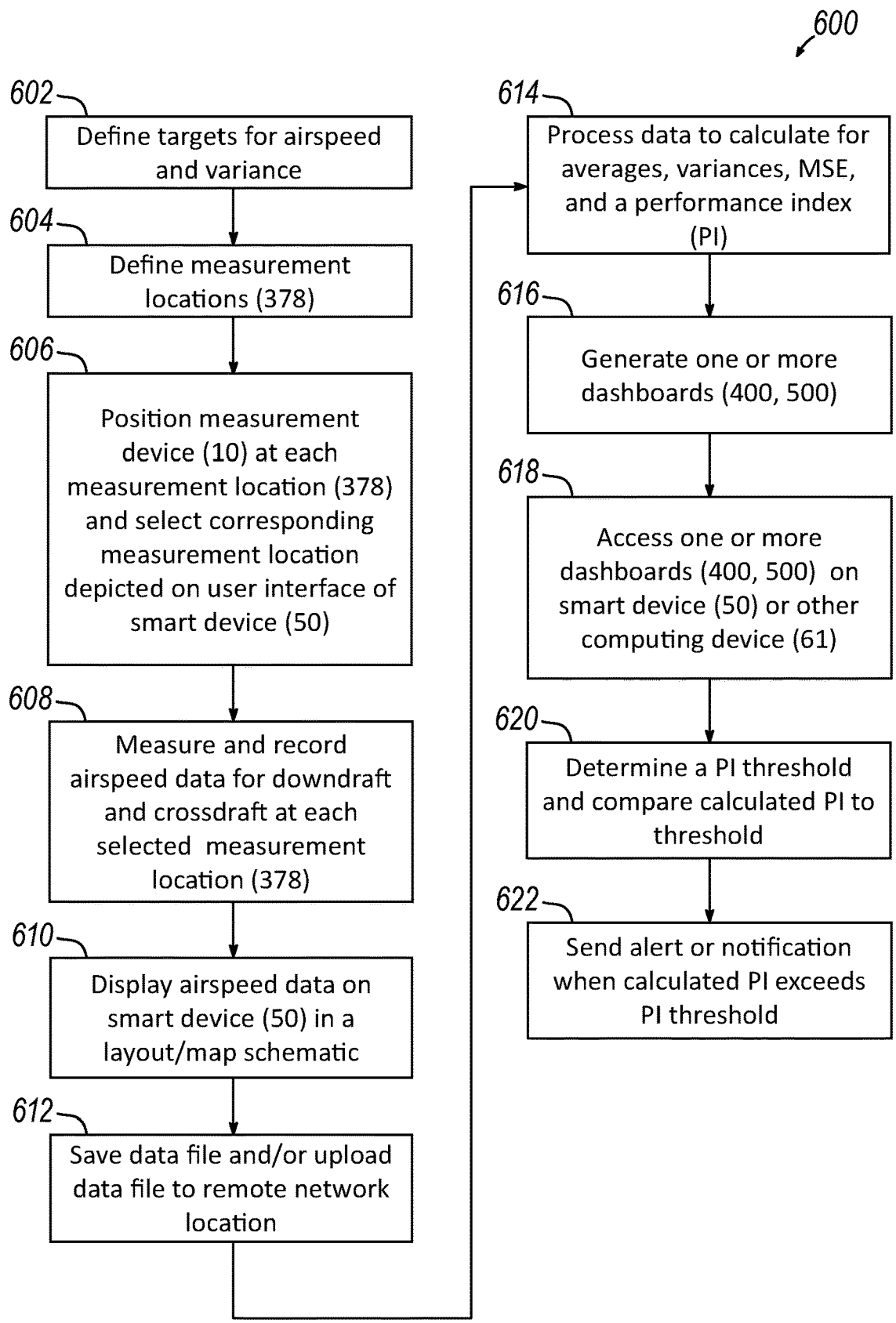
FIG. 36 depicts a block diagram of an exemplary method of using the air measuring device of FIG. 1 in healthcare environments.

FIG. 36 depicts an exemplary block diagram of a method (600) for monitoring and/or optimizing performance of airflow in a healthcare environment. At block (602), targets are defined in terms of downdraft airspeed, crossdraft airspeed, downdraft airspeed acceptable variance, and crossdraft airspeed acceptable variance. At block (604) measurement locations (378) are defined for the environment. At block (606) measurement device (10, 1010) is positioned at each respective measurement location (378), and when at measurement location (378) the corresponding measurement location depicted on the associated user interface of smart device (50) is selected. At block (608) device (10, 1010) measures and records airspeed data for downdraft and crossdraft at each selected measurement location (378).

With the data collected, at block (610) the airspeed data is displayed on smart device (50), and in one example is displayed in a healthcare environment layout/map schematic that corresponds with measurement locations (378). At block (612) the data file is saved and/or uploaded to a network, which could be a local or remote network. For instance, in one example the data file is uploaded to a cloud storage location. At block (614), the data from the data file is processed to calculate averages, variances, MSE, and performance index statistics using the BPI equation for example. At block (616) a dashboard (400, 500) is generated, and at block (618) the dashboard is accessed on smart device (50) or another computing device (61). As mentioned above, in some cases electronic dashboard files are transmitted to smart device (50) or other computing devices (61) and then accessed, while in other cases the electronic dashboards are accessed from a remote location by smart device (50) or other computing devices (61).

At block (620), a threshold for the performance index is determined and then compared with the calculated performance index. For example, in one version the threshold may be set at 1.5 and the calculated value is 1.7. At block (622) where the calculated performance index exceeds the threshold, an alert or notification is sent to smart device (50) or another computing device (61). In some instances, the alert or notification is sent as an email to a registered email address or as a text message to a registered phone number.

In view of the teachings herein, other methods and modifications to method (600) for use with device (10, 1010) in a healthcare environment application will be apparent to those of ordinary skill in the art. It should be noted that the steps shown and described with respect to method (600) may be completed in any order and thus the method is not required to proceed sequentially as illustrated by the arrow progression in FIG. 36. Furthermore, it should be understood that not all steps are required to be completed in each application or use of method (600).

IV. Miscellaneous

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

We claim:

1. A system for measuring and analyzing airspeed performance in a defined environment, wherein the system comprises:
   (a) an airspeed measurement device having
      (i) a body,
      (ii) a sensor assembly connectable with the body, wherein the sensor assembly is configured to detect airspeed data along two axes, wherein a first axis comprises a downdraft axis, and wherein a second axis comprises a crossdraft axis, and
      (iii) a receiving portion connectable with the body and configured to receive a first computing device configured to receive a set of data from the sensor assembly;
   (b) a first user interface displayable on the first computing device, wherein the first user interface graphically depicts the defined environment and airspeed measurement locations within the defined environment; and
   (c) a second user interface displayable on a select one or both of the first computing device and a second computing device, wherein the second user interface graphically depicts the set of data collected by the airspeed measurement device in the defined environment with the set of data depicted corresponding to the airspeed measurement locations identified in the first user interface.

2. The system of claim 1, wherein the first computing device is configured to transmit the set of data to a remote computing device, wherein the remote computing device comprises a computer readable medium having a set of instructions to execute an analysis of the set of data and display the analysis as at least a portion of the second user interface.

3. The system of claim 2, wherein the second user interface includes a single metric indicative of the overall performance of the defined environment relative to a predefined target performance.

4. The system of claim 3, wherein the single metric indicative of the overall performance of the defined environment is determined according to the equation:

$$BPI = \sum_{1}^{n} \frac{\left(\sqrt{(ActualDD - TargetDD)^2 + (ActualCD - TargetCD)^2}\right)}{\left(\sqrt{(VarDD^2 + VarCD^2)}\right)}$$

wherein,
BPI represents the single metric,
n represents the measurement number from the $1^{st}$ to the $n^{th}$
ActualDD represents the average of the measured downdraft,
TargetDD represents a target downdraft,
ActualCD represents the average of the measured crossdraft,
TargetCD represents a target crossdraft,
VarDD represents the acceptable variance from the downdraft target, and
VarCD represents the acceptable variance from the crossdraft target.

5. The system of claim 1, wherein the set of data depicted in the second user interface comprises an average downdraft airspeed, an average crossdraft airspeed, a change in average downdraft airspeed, and a change in average crossdraft airspeed for each of the measurement locations.

6. The system of claim 1, wherein the defined environment comprises a spray booth.

7. The system of claim 1, wherein the defined environment comprises a heathcare room.

8. The system of claim 1, wherein the second user interface identifies a first region and a second region within the defined environment, wherein an airflow in the defined environment flows from the first region to the second region.

9. The system of claim 2, wherein the airspeed measurement device is positionable within the use environment at multiple heights, wherein the set of data includes data at the multiple heights, wherein the analysis of the set of data and display of the analysis as at least a portion of the second user interface includes a three dimensional mapping of an airflow in the defined environment.

10. The system of claim 1, wherein the remote computing device is located within a cloud computing environment, wherein the first computing device is configured to communicate with the cloud computing environment to transfer data to and receive data from the cloud computing environment.

11. A method of monitoring performance in a use environment using a portable airspeed measurement device comprising (a) a body, (b) a sensor assembly connectable with the body, wherein the sensor assembly is configured to detect airspeed data along two axes, wherein a first axis of the two axes comprises a downdraft axis, and wherein a second axis of the two axes comprises a crossdraft axis, and (c) a computing device connectable with the body and in communication with the sensor assembly to receive the airspeed data from the sensor assembly, wherein the method comprises:
   (a) defining a target for downdraft airspeed along the downdraft axis;
   (b) defining a target for crossdraft airspeed along the crossdraft axis;
   (c) defining multiple measurement locations within the use environment;
   (d) positioning the airspeed measurement device at each measurement location and collecting downdraft and crossdraft airspeed data at each measurement location; and
   (e) displaying the collected data on a first user interface depicting a layout of the use environment such that the depicted data corresponds with the measurement location from which the data was collected.

12. The method of claim 11, further comprising:
(f) transmitting the collected downdraft and crossdraft airspeed data from the computing device to a cloud computing environment;
(g) generating a second user interface within the cloud computing environment, wherein the second user interface includes a graphical display showing changes in downdraft and crossdraft airspeed;
(h) displaying the second user interface on a select one or more of the computing device and a remote computing device.

\* \* \* \* \*